US012673322B2

(12) United States Patent
Xu et al.

(10) Patent No.: US 12,673,322 B2
(45) Date of Patent: Jul. 7, 2026

(54) DEVICE AND DRIVING METHOD FOR DRIVING MICROFLUIDIC CHIP

(71) Applicant: BOE TECHNOLOGY GROUP CO., LTD., Beijing (CN)

(72) Inventors: Weifeng Xu, Beijing (CN); Beiyuan Fan, Beijing (CN); Da Li, Beijing (CN); Ding Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1218 days.

(21) Appl. No.: 17/605,348

(22) PCT Filed: Jan. 29, 2021

(86) PCT No.: PCT/CN2021/074474

§ 371 (c)(1),
(2) Date: Oct. 21, 2021

(87) PCT Pub. No.: WO2022/160278

PCT Pub. Date: Aug. 4, 2022

(65) Prior Publication Data

US 2023/0116464 A1 Apr. 13, 2023

(51) Int. Cl.
*B01L 3/00* (2006.01)
*B01L 9/00* (2006.01)

(52) U.S. Cl.
CPC ..... *B01L 3/502715* (2013.01); *B01L 3/50273* (2013.01); *B01L 3/502738* (2013.01);
(Continued)

(58) Field of Classification Search
None
See application file for complete search history.

(56) References Cited

U.S. PATENT DOCUMENTS 9,144,799 B2 9/2015 Rose et al.
2002/0045246 A1 4/2002 McMillan et al.
(Continued)

FOREIGN PATENT DOCUMENTS

CN 102202791 A 9/2011
CN 103881896 A 6/2014
(Continued)

OTHER PUBLICATIONS

Chinese Office Action corresponding to Chinese Patent Application No. 202180000100.2 (Foreign Text and English Translation Thereof, 24 Pages) (May 11, 2024).
(Continued)

*Primary Examiner* — Brian R Gordon
(74) *Attorney, Agent, or Firm* — Myers Bigel, P.A.

(57) ABSTRACT

A device and a driving method for driving a microfluidic chip are disclosed. The device for driving a microfluidic chip includes a carrying member configured to carry the micro-fluidic chip; a releasing member configured to electrically connected to the microfluidic chip, and control the release of the reagent of the microfluidic chip, a valve control member configured to control the opening and closing of the flow channel in the valve control area of the microfluidic chip when the valve control area is within the valve control range of the valve control member, a fluid driving member configured to drive the flow of fluid in the microfluidic chip, and a controller configured to control the driving process of the microfluidic chip.

20 Claims, 19 Drawing Sheets

(52) U.S. Cl.
CPC ......... *B01L 3/502746* (2013.01); *B01L 9/527* (2013.01); *B01L 2200/027* (2013.01); *B01L 2200/10* (2013.01); *B01L 2200/16* (2013.01); *B01L 2300/0851* (2013.01); *B01L 2300/0858* (2013.01); *B01L 2300/0861* (2013.01); *B01L 2300/1827* (2013.01); *B01L 2400/0415* (2013.01); *B01L 2400/0487* (2013.01)

(56) References Cited

U.S. PATENT DOCUMENTS

| | | | | |
|---|---|---|---|---|
| 2003/0080085 | A1 | 5/2003 | Greenberg et al. | |
| 2004/0126279 | A1 | 7/2004 | Renzi et al. | |
| 2006/0093488 | A1 | 5/2006 | Wong et al. | |
| 2011/0200486 | A1 | 8/2011 | Beumer et al. | |
| 2013/0313116 | A1 | 11/2013 | Palmer et al. | |
| 2016/0008811 | A1 | 1/2016 | Laser et al. | |
| 2016/0289665 | A1 | 10/2016 | Mao et al. | |
| 2018/0021783 | A1* | 1/2018 | Arlett | G01N 35/00029 435/287.2 |
| 2020/0070167 | A1* | 3/2020 | Raillon | B01L 3/502707 |
| 2020/0078786 | A1 | 3/2020 | Park et al. | |
| 2020/0086324 | A1 | 3/2020 | Swenson et al. | |
| 2020/0116750 | A1* | 4/2020 | Dority | B01L 3/502715 |
| 2021/0308673 | A1* | 10/2021 | Chiu | G01N 33/54386 |
| 2022/0250068 | A1 | 8/2022 | Xu | |

FOREIGN PATENT DOCUMENTS

| | | | |
|---|---|---|---|
| CN | 203825016 | U | 9/2014 |
| CN | 104730265 | A | 6/2015 |
| CN | 104833812 | A | 8/2015 |
| CN | 107090403 | A | 8/2017 |
| CN | 207210442 | U | 4/2018 |
| CN | 207793229 | U | 8/2018 |
| CN | 109022274 | A | 12/2018 |
| CN | 109647553 | A | 4/2019 |
| CN | 109661273 | A | 4/2019 |
| CN | 208796039 | U | 4/2019 |
| CN | 110579594 | A | 12/2019 |
| CN | 110694702 | A | 1/2020 |
| CN | 110805539 | A | 2/2020 |
| CN | 110998333 | A | 4/2020 |
| CN | 111135892 | A | 5/2020 |
| CN | 111514948 | A | 8/2020 |
| CN | 111537707 | A | 8/2020 |
| CN | 211289152 | U | 8/2020 |
| CN | 115326788 | A | 11/2022 |
| CN | 116948782 | A | 10/2023 |
| GB | 1186409 | A | 4/1970 |
| IN | 105302192 | A | 2/2016 |
| WO | 2013074693 | A1 | 5/2013 |
| WO | 2014150798 | A1 | 9/2014 |

OTHER PUBLICATIONS

Kinahan et al. "Paper imbibition for timing of multi-step liquid handling protocols on event-triggered centrifugal microfluidic lab-on-a-disc platforms" RSC Advances, 5(3): 1818-1826 (Dec. 31, 2015).

Shi, Jinshui "Design of Microfluidic Chip and its Control System Based on Single Motor Drive" Mechanical Engineer 12:97-99, 102 (Dec. 10, 2023).

Yuanfen et al. "Storage and Release of Fluid Reagents in the Integrated Microfluidic Chip" Micronanoelectronic Technology 58(2):144-151 (Feb. 9, 2021).

Extended European Search Report for EP Application No. 21921882.3 (8 pages) (dated Oct. 25, 2023).

Li, Jin-Man , et al., "Optimization of Automatic Flow Chart for Nucleic Acid Extraction from Intestinal Microflora", China Biotechnology, vol. 37, No. 11, Nov. 15, 2017, pp. 6-11.

* cited by examiner

DEVICE AND DRIVING METHOD FOR DRIVING MICROFLUIDIC CHIP

RELATED APPLICATIONS

The present application is a 35 U.S.C. 371 national stage application of PCT International Application No. PCT/CN2021/074474 filed on Jan. 29, 2021, the entire disclosure of which is incorporated herein by reference.

TECHNICAL FIELD

The present disclosure relates to the field of biological detections, and more particularly to a device and a driving method for driving a microfluidic chip.

BACKGROUND

A microfluidic chip is also called Lab-on-a-chip, which refers to the integration of basic operation units, such as sample preparation, reaction, separation, and detection involved in the fields of biology, chemistry, and medicine, onto a chip with micrometer-scale microchannels, so that the whole process of reaction and analysis can be automatically completed. The analysis and detection device based on the microfluidic chip may have the following advantages: a small amount of sample, a fast analysis speed, and good suitability for real-time and on-site analysis. Moreover, the microfluidic chip can be designed as a one-time use product, which can eliminate liquid path systems such as waste liquid treatment and complicated cleaning.

SUMMARY

In one aspect of the present disclosure, there is provided a device for driving a microfluidic chip, comprising: a carrying member configured to carry the microfluidic chip; a releasing member configured to electrically connected to the microfluidic chip, and control the release of a reagent of the microfluidic chip; a valve control member configured to control the opening and closing of a flow channel in a valve control area of the microfluidic chip when the valve control area is within a valve control range of the valve control member; a fluid driving member configured to drive the flow of fluid in the microfluidic chip; and a controller configured to control a driving process of the microfluidic chip.

In some embodiments, the carrying member comprises: a carrying tray, which comprises a bottom wall of the carrying tray, and side walls of the carrying tray on both sides of the bottom wall of the carrying tray and connected to the bottom wall of the carrying tray; and a carrying tray driving section configured to drive the carrying tray to move between a first position and a second position, wherein a position of the carrying tray when the device drives the fluid of the microfluidic chip is the first position, and a position of the carrying tray when the microfluidic chip is loaded and unloaded on the carrying tray is the second position.

In some embodiments, the device further comprises: a housing that at least partially surrounding the releasing member, the valve control member, the fluid driving member, and the controller, wherein the housing comprises a bottom wall of the housing and a side wall of the housing, an opening is provided on the side wall of the housing, and the opening is on a line between the first position and the second position of the carrying tray.

In some embodiments, the carrying tray driving section comprises a carrying tray power module, a carrying tray transmission module, and a carrying tray slide rail, the carrying tray transmission module is connected to the carrying tray, the carrying tray slide rail is fixed on the bottom wall of the housing and the carrying tray power module drives the carrying tray transmission module to drive the carrying tray to move on the carrying tray slide rail.

In some embodiments, the carrying tray power module comprises a carrying tray motor, the carrying tray transmission module comprises a carrying tray slider that moves on the carrying tray slide rail and a carrying tray connector, the carrying tray slider is fixedly connected to the carrying tray through the carrying tray connector, and the carrying tray motor drives the carrying tray slider to move on the carrying tray slide rail.

In some embodiments, the carrying tray motor is a stepping motor, and the stepping motor is fixed on the bottom wall of the housing, the carrying tray transmission module further comprises a carrying tray sliding table and a carrying tray screw, the carrying tray sliding table is coaxially connected to a rotor of carrying tray motor by the carrying tray screw, the carrying tray sliding table is fixedly connected to the carrying tray slider, and an extension direction of the screw is parallel to an extension direction of the carrying tray slide rail.

In some embodiments, the carrying tray driving section further comprises a first carrying tray stop and a second carrying tray stop on both sides of the carrying tray sliding table, and the carrying tray screw passes through the first carrying tray stop and the second carrying tray stop, and the first carrying tray stop and the second carrying tray stop are fixed on the bottom wall of the housing.

In some embodiments, the fluid driving member comprises a fluid driving member driving section and a first movement module, the fluid driving member driving section is configured to drive the first movement module to move between a third position and a fourth position in a first direction, and the third position and the fourth position respectively correspond to end positions of two ends of a reciprocating movement of the first movement module in the first direction when the device drives the fluid of the microfluidic chip.

In some embodiments, the fluid driving member driving section comprises a fluid driving member power module, a fluid driving member transmission module, and a fluid driving member slide rail, the fluid driving member transmission module is connected to the first movement module, the fluid driving member slide rail is fixed to the bottom wall of the housing, and the fluid driving member power module drives the fluid driving member transmission module to drive the first movement module to move on the fluid driving member slide rail.

In some embodiments, the fluid driving member power module comprises a fluid driving member motor, the fluid driving member transmission module comprises a fluid driving member slider that moves on the fluid driving member slide rail and a fluid driving member connector, the fluid driving member slider is fixedly connected to the first movement module through the fluid driving member connector, and the fluid driving member motor drives the fluid driving member slider to move on the fluid driving member slide rail.

In some embodiments, the fluid driving member motor is a stepping motor, and the stepping motor is fixed on the side wall of the housing, the fluid driving member transmission module further comprises a fluid driving member sliding table and a fluid driving member screw, the fluid driving member sliding table is coaxially connected to a rotor of the fluid driving member motor by the fluid driving member screw, the fluid driving member sliding table is fixedly connected to the fluid driving member slider, and an extension direction of the screw is parallel to an extension direction of the fluid driving member sliding rail.

In some embodiments, the fluid driving member driving section further comprises a first fluid driving member stop and a second fluid driving member stop on both sides of the fluid driving member sliding table, and the fluid driving member screw passes through the first fluid driving member stop and the second fluid driving member stop, and the first fluid driving member stop and the second fluid driving member stop are fixed on the side wall of the housing.

In some embodiments, the fluid driving member further comprises: a second movement module, the second movement module is configured to engage with the microfluidic chip when the microfluidic chip is carried on the carrying tray and the carrying tray is in the first position, and the second movement module moves with the first movement module in the first direction.

In some embodiments, the microfluidic chip comprises a chip driving member, and the chip driving member comprises a first plug-in block, the second movement module comprises: a first protrusion, the first protrusion comprises an inclined surface, wherein when the microfluidic chip is carried on the carrying tray and the carrying tray is in the second position, the inclined surface and the end surface of the first plug-in block close to the inclined surface is opposite to each other; a first slot, wherein when the microfluidic chip is carried on the carrying tray and the carrying tray is in the second position, the first slot is at a side of the first protrusion away from the end surface; and a second protrusion, the second protrusion is on a side of the first slot away from the first protrusion, and wherein, the first plug-in block is configured to move in a second direction when the carrying tray moves between the second position and the first position, the second direction is in a same plane as an extension direction of the inclined surface and neither parallel nor perpendicular to the extension direction of the inclined surface, wherein, the fluid driving member further comprises: a shaft, the first motion module is coaxially connected to the second movement module by the shaft, the first motion module is slidable in a third direction relative to the shaft, and the third direction is in a plane defined by the second direction and the extension direction of the inclined surface; and an elastic member that surrounds the shaft, and the elastic member is between the first movement module and the second movement module.

In some embodiments, the second direction is parallel to the first direction, the third direction is perpendicular to the first direction, and when the microfluidic chip is carried on the carrying tray and the carrying tray is in the second position, the end surface of the first plug-in block close to the inclined surface is perpendicular to the first direction.

In some embodiments, the first protrusion further comprises: retaining walls on both sides of the inclined surface along the extension direction of the inclined surface.

In some embodiments, the chip driving member further comprises a cylindrical syringe, the cylindrical syringe comprising: a cylinder, a piston configured to move within the cylinder, and a push rod configured to control the piston, and the push rod is fixedly connected with the first plug-in block.

In some embodiments, the microfluidic chip comprises two sets of chip drive members, and the two sets of chip drive members are respectively on both sides of the microfluidic chip, the device comprises two sets of fluid driving members configured to control the two sets of chip drive members respectively, and the two sets of fluid driving members are respectively on both sides of the device, the two sets of fluid driving members comprise two fluid driving member slide rails, and an orthographic projection of the carrying tray on the bottom wall of the housing is between orthographic projections of the two fluid driving member slide rails on the bottom wall of the housing.

In some embodiments, the carrying tray comprises a recess that matches a shape and position of the cylindrical syringe.

In some embodiments, the microfluidic chip further comprises: a reservoir; and a control electrode for controlling the release of the reagent from the reservoir, wherein, the releasing member is configured to be electrically connected with the control electrode when the microfluidic chip is carried on the carrying tray and the carrying tray is in the first position.

In some embodiments, the releasing member comprises: a releasing member supporting seat, the releasing member supporting seat being fixed on the bottom wall of the housing; and an electrode contact installed on the releasing member supporting seat; wherein the electrode contact is electrically connected to the control electrode when the microfluidic chip is carried on the carrying tray and the carrying tray is in the first position.

In some embodiments, the electrode contact comprises a pogo pin connector.

In some embodiments, the microfluidic chip further comprises a second plug-in block, and the carrying tray further comprises a second slot matching a shape and position of the second plug-in block.

In some embodiments, the valve control member comprises: a valve control tray; a valve control valve, the valve control valve being located on the valve control tray and configured to control the opening and closing of the flow channel in the valve control area, and a valve-controlled tray driving section configured to drive the valve control tray to move between a fifth position and a sixth position in a fourth direction, and the fifth position and the sixth position respectively correspond to end positions of two ends of a reciprocating movement of the valve control tray when the device drives the microfluidic chip.

In some embodiments, the valve-controlled tray driving section comprises a valve control tray power module and a valve control tray transmission module, the valve control tray transmission module is connected to the valve control tray, and the valve control tray power module drives the valve control tray transmission module to drive the valve control tray to move between the fifth position and the sixth position in a fourth direction.

In some embodiments, the valve control tray power module comprises a valve control member motor, the valve control member motor is a stepping motor, and the stepping motor is fixedly connected to the side wall of the housing, the valve control tray transmission module further comprises a valve control tray sliding table and a valve control tray screw, the valve control tray sliding table is coaxially connected to a rotor of the valve control member motor by the valve control tray screw, the valve control tray sliding table is fixedly connected to the valve control tray, and an extension direction of the valve control tray screw is parallel to the fourth direction.

In some embodiments, the valve control tray driving section further comprises a first valve control tray stop and a second valve control tray stop on both sides of the valve control tray sliding table, the valve control tray screw passes through the first valve control tray stop and the second valve control tray stop, and the first valve control tray stop is fixed on the side wall of the housing, the second valve control tray stop is fixed on the bottom wall of the housing.

In some embodiments, the carrying tray slide rail comprises two rails, and an orthographic projection of the valve control member on the bottom wall of the housing is between orthographic projections of the two rails on the bottom wall of the housing, and the valve control tray is between the first position of the carrying tray and the bottom wall of the housing.

In some embodiments, the valve control area comprises a thin film valve configured to control the opening and closing of the flow channel, and the valve control valve is configured to control the thin film valve in response to a power supply state.

In some embodiments, the valve control valve comprises a solenoid valve, and the solenoid valve comprises a de-energized electromagnet.

In some embodiments, a first through hole is provided on the bottom wall of the carrying tray, wherein, when the microfluidic chip is carried on the carrying tray, a projection of the valve control area on the carrying tray along the fourth direction at least partially overlaps the first through hole.

In some embodiments, the device further comprises: a temperature control member configured to control a temperature of a temperature control area of the microfluidic chip when the temperature control area is within a temperature control range of the temperature control member.

In some embodiments, when the device drives the fluid of the microfluidic chip, the valve control tray is in the sixth position, and when the carrying tray is in a position other than the first position, the valve control tray is in the fifth position, when the valve control tray is in the sixth position, the valve control valve is inserted into the first through hole and an end surface of the valve control valve away from the valve control tray and a surface of the bottom wall of the carrying tray away from the valve control tray are flush, and when the valve control tray is in the fifth position, a distance between the valve control tray and the carrying tray is greater than a distance between the valve control tray and the carrying tray when the valve control tray is in the sixth position, and when the valve control tray is in the fifth position, an end surface of the valve control valve away from the valve control tray is a distance away from the carrying tray.

In some embodiments, a second through hole is further provided on the bottom wall of the carrying tray, wherein, when the microfluidic chip is carried on the carrying tray, a projection of the temperature control area of the microfluidic chip on the carrying tray along the fourth direction at least partially overlaps the second through hole.

In some embodiments, the temperature control member is installed on the valve control tray: when the device drives the fluid of the microfluidic chip, the valve control tray is in the sixth position, and when the carrying tray is in a position other than the first position, the valve control tray is in the fifth position, when the valve control tray is in the sixth position, the temperature control member is inserted into the second through hole and an end surface of the temperature control member away from the valve control tray and the surface of the bottom wall of the carrying tray away from the valve control tray are flush, and when the valve control tray is in the fifth position, a distance between the valve control tray and the carrying tray is greater than a distance between the valve control tray and the carrying tray when the valve control tray is in the sixth position, and when the valve control tray is in the fifth position, the end surface of the temperature control member away from the valve control tray is a distance away from the carrying tray.

In some embodiments, the temperature control member comprises a PTC heater or a cermet heating element.

In some embodiments, the releasing member supporting seat is provided with a through hole, and the valve control tray is connected to the valve control tray sliding table through the through hole.

In some embodiments, the device further comprises: a display outside the housing, configured to display a driving state, or receive a control instruction.

In some embodiments, the device is a portable automatic drive device.

In another aspect of the present disclosure, there is also provided a driving method for the aforementioned device, comprising: loading the microfluidic chip onto the carrying member, so that the releasing member is electrically connected to the microfluidic chip, the fluid driving member is engaged with the microfluidic chip, and the valve control area of the microfluidic chip is within the valve control range of the valve control member; and powering on and off the valve control member in sequence to control the opening and closing of the flow channel in the valve control area, powering on and off the releasing member in sequence to control the release of the reagent of the microfluidic chip, and controlling the fluid driving member to drive the flow and reaction of fluid in the microfluidic chip.

BRIEF DESCRIPTION OF THE DRAWINGS

In order to more clearly describe the technical solutions in the embodiments of the present disclosure, the drawings that need to be used in the description of the embodiments will be briefly introduced below. Obviously, the drawings in the following description are only some embodiments of the present disclosure.

FIGS. 5*a*-5*e* show partial structural schematic diagrams of a device for driving a microfluidic chip according to some embodiments of the present disclosure, in which FIGS. 5*a*-5*c* are respectively at different stages when the carrying member moves from the second position to the first position, the first movement module is in the third position in FIGS. 5*a*-5*d*, and the first movement module is in the fourth position in FIG. 5*e*, FIG. 5*f*-5*g* respectively show schematic diagram of the device for driving the microfluidic chip and the partial structure of the microfluidic chip according to some embodiments of the present disclosure;

DETAILED DESCRIPTION

In order to make the objectives, technical solutions, and advantages of the embodiments of the present disclosure more clear, the technical solutions of the embodiments of the present disclosure will be described in further detail below in conjunction with the accompanying drawings.

In some cases, the microfluidic chip needs to be used in conjunction with a device for driving the microfluidic chip to complete the operation of driving the microfluidic chip, for example, to realize the movement, mixing, reaction, and detection of the fluid. The performance of the device used to drive the microfluidic chip directly affects the performance of the microfluidic chip and the efficiency and quality of task completion.

The inventor of the present disclosure found that there are two current mainstream development directions for devices for driving a microfluidic chip. One is the development of large-scale and high-throughput devices, which are mainly used in large hospitals and inspection centers; the other is a portable device that is developed towards miniaturization, portability, and rapidity, which is mainly used for on-site and individualized rapid detection. The driving principle of the device in the related art is mainly the pipetting type or the magnetic rod type. Among them, the prominent problem of the pipetting type is that it is easy to cause dead volume residue and reagent loss, while the magnetic rod type is characterized by relatively high flux, but only consumables and kits of specific specifications may be used so that the reagent consumption is large, and the extracted samples need to be further manually transferred before subsequent research may be carried out, which is a cumbersome process.

The inventor of the present disclosure further discovered that, in related art devices, a mechanical arm is usually used for pipetting or other sample transfer operations, which is complicated in structure and operation, and takes up a large volume and is not convenient to carry.

In order to solve at least part of the above problems, the present invention provides a device for driving a microfluidic chip and a driving method thereof.

Figure 1A:
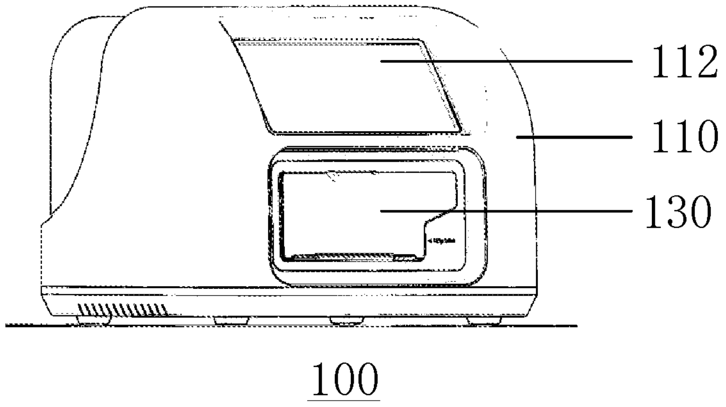
FIG. 1*a* shows a schematic diagram of a device for driving a microfluidic chip according to some embodiments of the present disclosure.
Figure 1B:
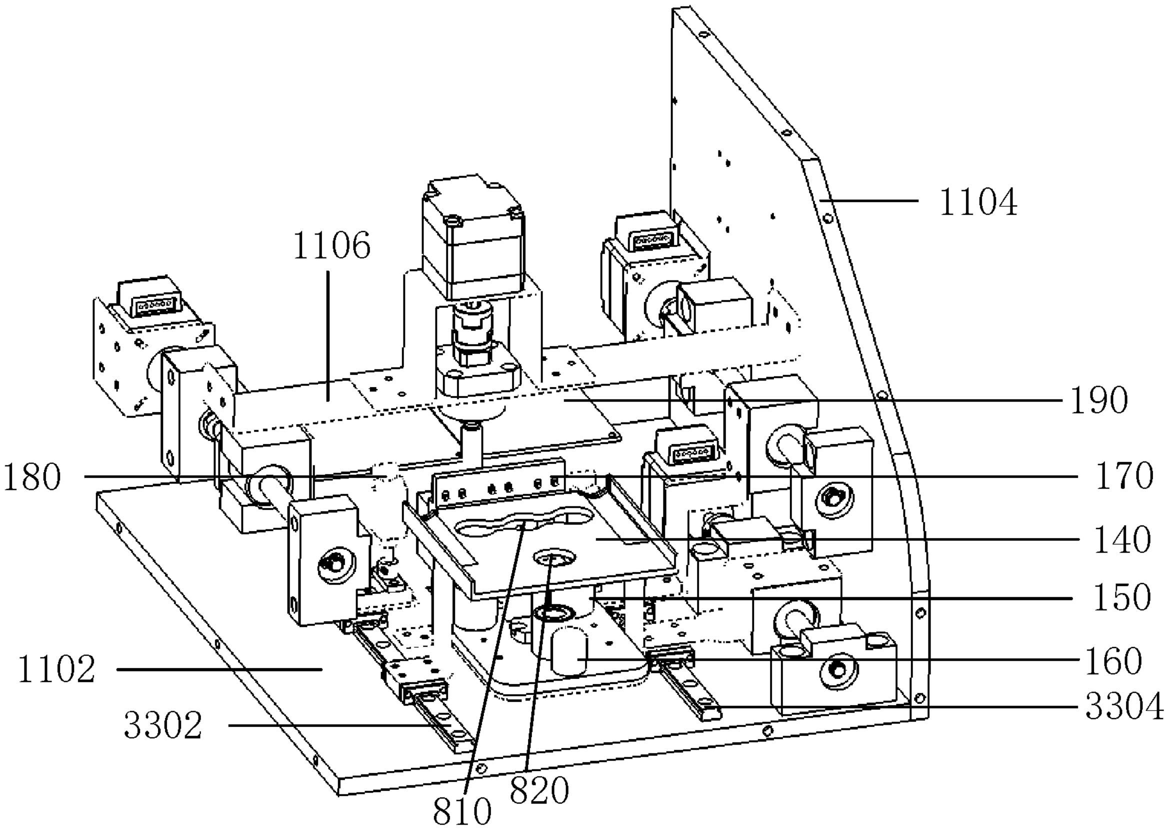
FIG. 1*b* shows a schematic diagram of the internal structure of a device for driving a microfluidic chip according to some embodiments of the present disclosure.
Figure 1C:
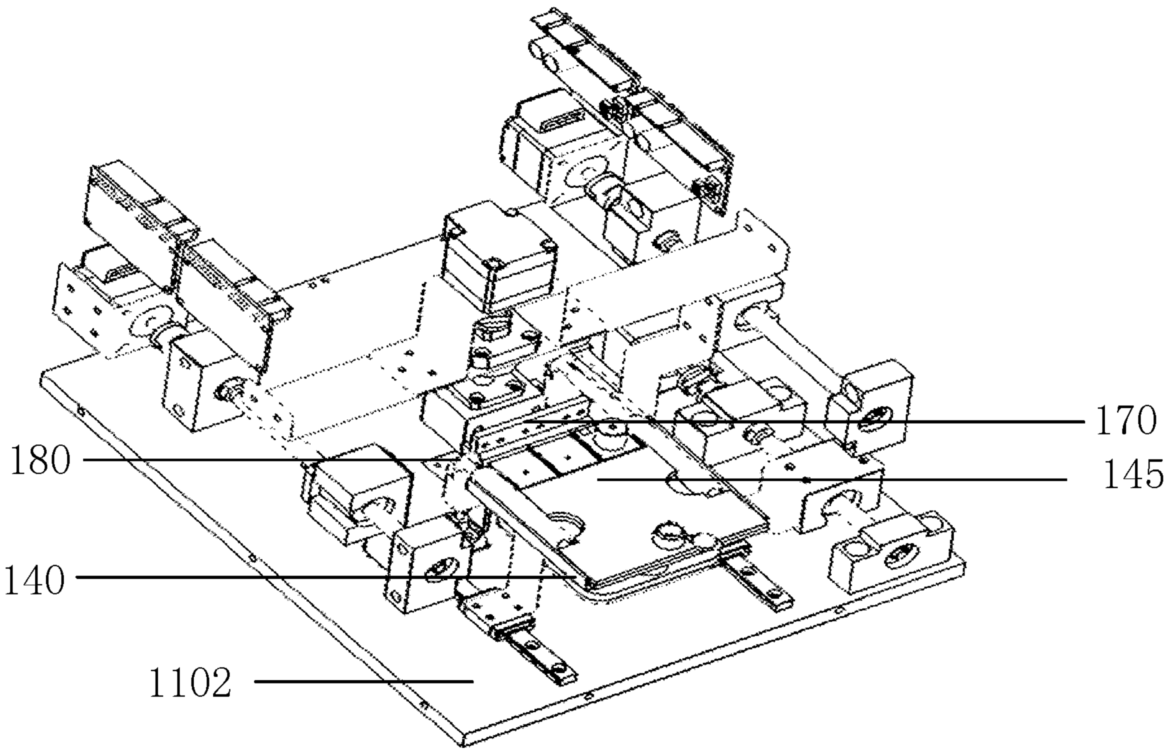
FIG. 1*c* respectively shows a device for driving a microfluidic chip and a partial structural schematic diagram of the microfluidic chip according to some embodiments of the present disclosure.

FIG. 1*a* shows a schematic diagram of a device for driving a microfluidic chip according to some embodiments of the present disclosure. FIG. 1*b* shows a schematic diagram of the internal structure of a device for driving a microfluidic chip according to some embodiments of the present disclosure. FIG. 1*c* shows a device for driving a microfluidic chip according to some embodiments of the present disclosure and a partial structural schematic diagram of the microfluidic chip. Refer to FIGS. 1*a*-1*c*, an embodiment of the present disclosure provides a device 100 for driving a microfluidic chip 145, comprising: a carrying member 140 configured to carry the microfluidic chip 145; a releasing member 170 configured to electrically connected to the microfluidic chip 145, and control the release of the reagent of the microfluidic chip 145; a valve control member 150 configured to control the opening and closing of the flow channel in the valve control area of the microfluidic chip 145 when the valve control area is within the valve control range of the valve control member 145; a fluid driving member 180 configured to drive the flow of fluid in the microfluidic chip 145; and a controller 190 configured to control the driving process of the microfluidic chip 145.

The present disclosure provides a device for driving a microfluidic chip. By providing a carrying member, a releasing member, a valve control member, a fluid driving member and a controller, the carrying, power supply, flow channel control and fluid drive of the microfluidic chip may be realized. The device for driving a microfluidic chip of the present disclosure integrates all functional modules in a miniaturized housing, has a simple and compact structure, is easy to carry, and may realize the driving process of the microfluidic chip, i.e., fluid response, mixing, reaction, detection, extraction, and other processes, with one click. The device has the advantages of functional integration, reagent saving, good versatility, strong sealing, and the complex mechanical arm device and positioning structure are eliminated, which greatly reduces the device cost.

Figure 2A:
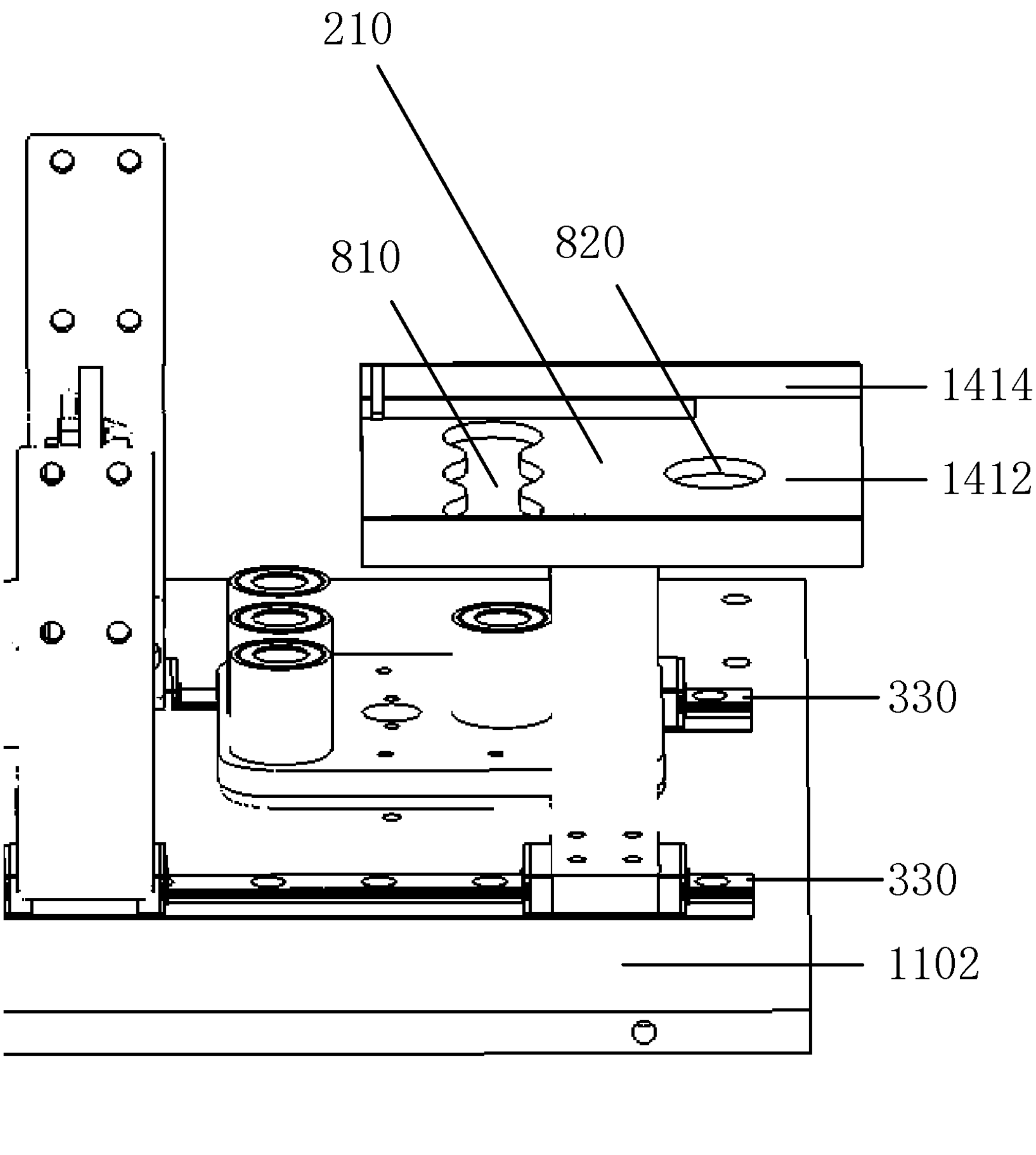
FIGS. 2*a*-2*b* schematically show partial structure diagrams of a device for driving a microfluidic chip according to some embodiments of the present disclosure.
Figure 2B:
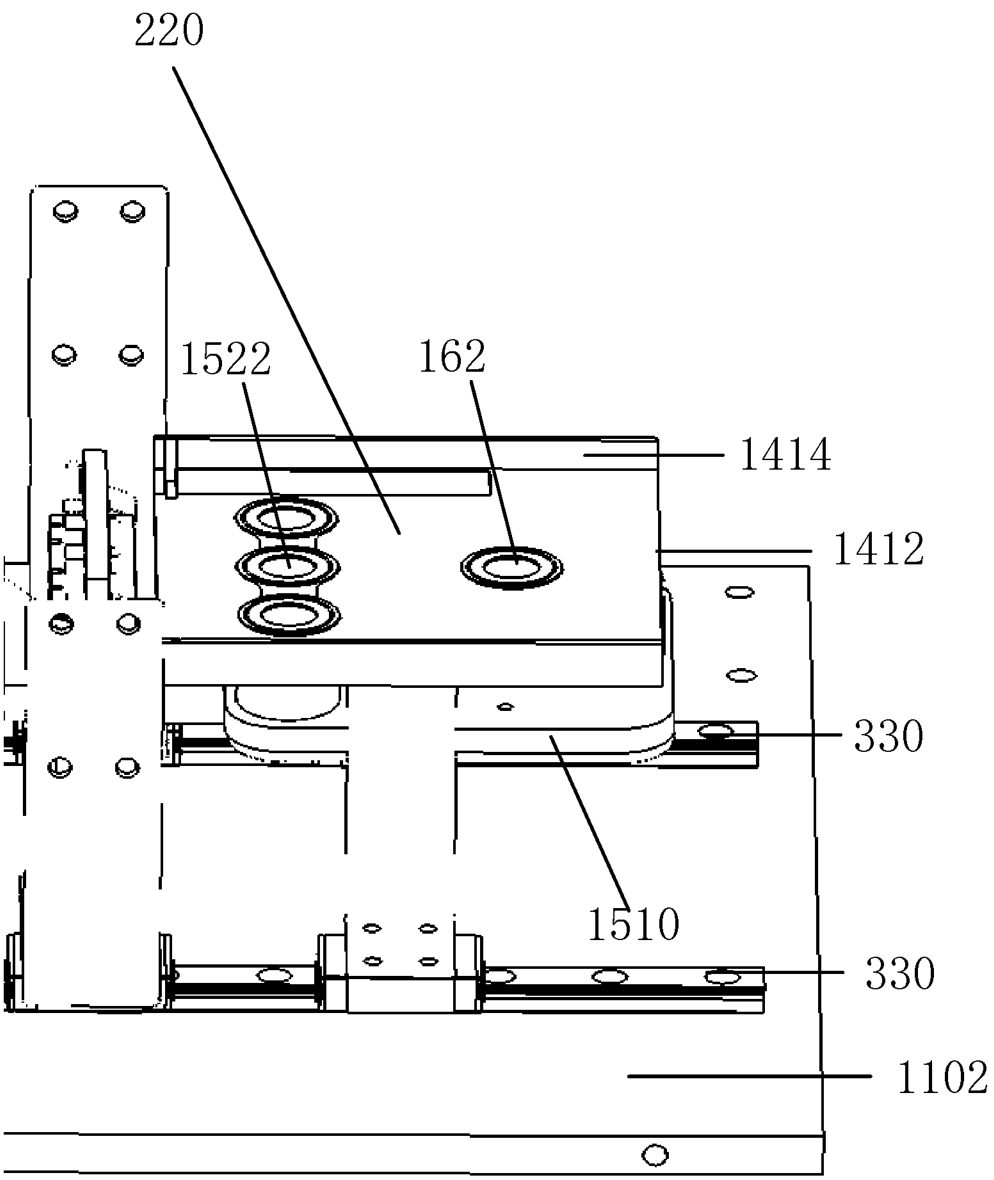
Figure 3A:
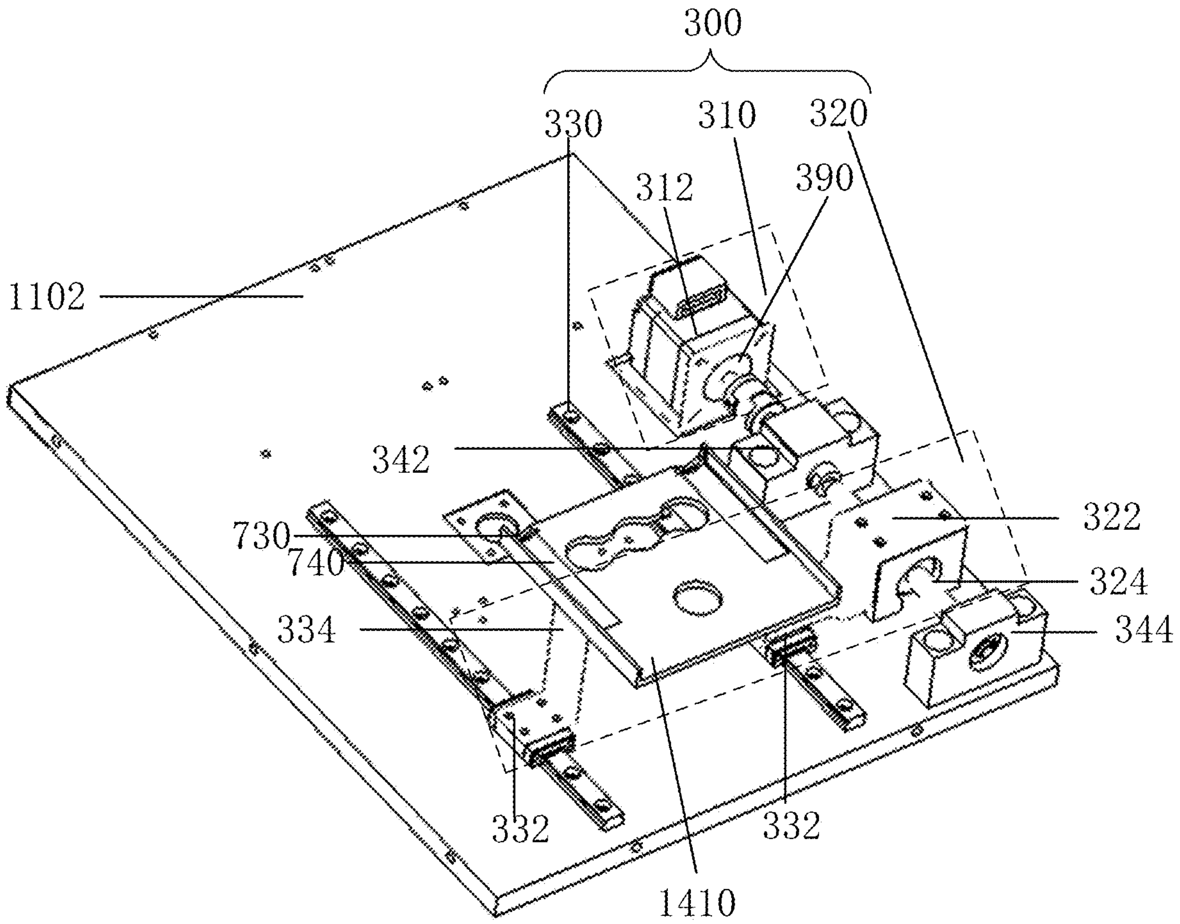
FIG. 3*a* shows a schematic diagram of a carrying member and its related structure according to some embodiments of the present disclosure.
Figure 3B:
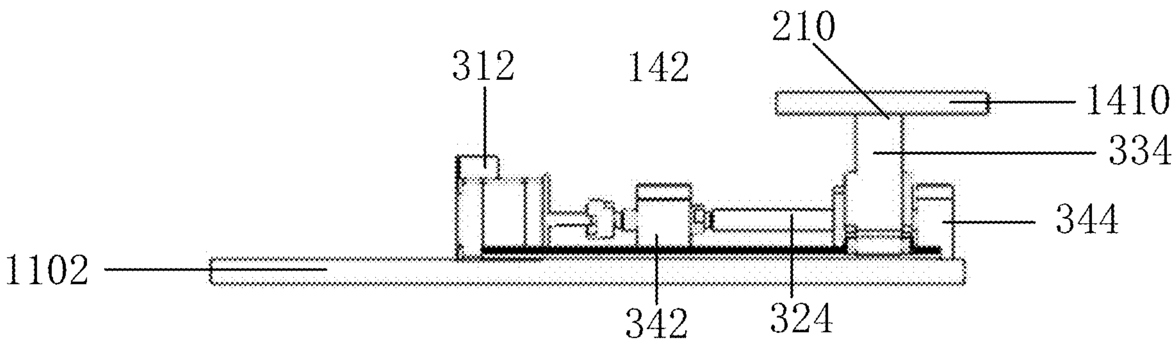
FIG. 3*b*-3*c* respectively show schematic side views of the structure shown in FIG. 3*a*, in which the carrying member is in the second position and the first position respectively.
Figure 3C:
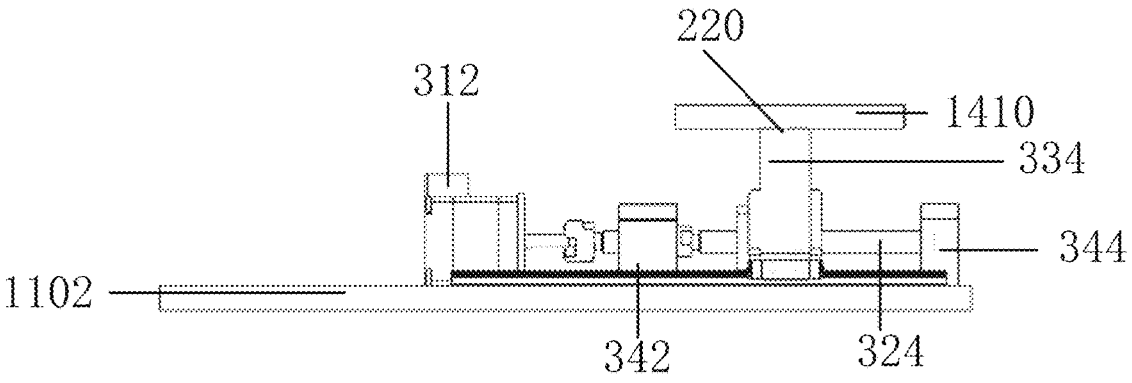

FIGS. 2*a*-2*b* schematically show a partial structural diagram of a device for driving a microfluidic chip according to some embodiments of the present disclosure. FIG. 3*a* shows a schematic diagram of a carrying member and its related structure according to some embodiments of the present disclosure. FIGS. 3*b*-3*c* respectively show schematic side views of the structure shown in FIG. 3*a*, in which the carrying tray is in the second position and the first position, respectively. Refer to FIGS. 1*a*-3*c*, in some embodiments, the carrying member 140 comprises: a carrying tray 1410, which comprises a bottom wall 1412 of the carrying tray, and side walls 1414 of the carrying tray on both sides of the bottom wall of the carrying tray and connected to the bottom wall of the carrying tray; and a carrying tray driving section 300 configured to drive the carrying tray 1410 to move between a first position 220 and a second position 210, wherein the position of the carrying tray 1410 when the device 100 drives the fluid of the microfluidic chip 145 is the first position, and the position of the carrying tray 1410 when the microfluidic chip 145 is loaded and unloaded on the carrying tray 1410 is the second position. For example, in FIGS. 2*a* and 2*b*, the carrying tray 1410 is in the second position 210 and the first position 220, respectively. In some embodiments, when the carrying tray 1410 is at the second position 210, the loading and unloading of the microfluidic chip 145 is performed; when the carrying tray 1410 is at the first position 220, the device 100 for driving the microfluidic chip 145 may be powered on for operations, such as response, mixing, reacting, detecting, and extracting of the fluid of the microfluidic chip 145 under the control of the controller 190. The carrying tray 1410 is simple and compact, which improves the portability of the device 100 for driving the microfluidic chip 145.

In FIGS. 1*a*-3*c*, in some embodiments, the device 100 further comprises: a housing 110 that at least partially surrounding the releasing member 170, the valve control member 150, the fluid driving member 180, and the controller 190, wherein the housing 110 comprises a bottom wall 1102 of the housing and a side wall 1104 of the housing, an opening 112 is provided on the side wall 1104 of the housing, and the opening 112 is located on the line between the first position 220 and the second position 210 of the carrying tray 1410. Optionally, the device 100 for driving a microfluidic chip further comprises a hatch (not shown), and the hatch is used to close the opening when no member passes through the opening. By providing an opening 112 on the side wall 1104 of the housing, the carrying tray 1410 is configured to move between the first position 220 and the second position 210 through the opening 112 and at least part of the carrying tray 1410 in the second position 210 is located outside the housing 110, and two types of work stations, namely, the unloading station and the working station, of the carrying tray 1410, may be realized, which facilitates the loading and unloading of the microfluidic chip.

In some embodiments, the device 100 for driving the microfluidic chip may adopt a flip-top structure, and the carrying member 140 does not need to be partially movable, but only needs to be in a fixed position. In this case, the housing 110 may be divided into upper and lower parts, and the microfluidic chip 145 may be directly loaded on the carrying member 140 by turning the upper part over.

Refer to FIGS. 2*a*-3*c*, in some embodiments, the carrying tray driving section 300 comprises a carrying tray power module 310, a carrying tray transmission module 320, and a carrying tray slide rail 330, the carrying tray transmission module 320 is connected to the carrying tray 1410, the carrying tray slide rail 330 is fixed on the bottom wall 1102 of the housing and the carrying tray power module 310 drives the carrying tray transmission module 320 to drive the carrying tray 1410 to move on the carrying tray slide rail 330. In this way, the moving of the carrying tray 1410 between the first position 220 and the second position 210 is realized.

In some embodiments, the carrying tray power module 310 comprises a carrying tray motor 312, the carrying tray transmission module 320 comprises a carrying tray slider 332 that moves on the carrying tray slide rail 330 and a carrying tray connector 334, the carrying tray slider 332 is fixedly connected to the carrying tray 1410 through the carrying tray connector 334, and the carrying tray motor 312 drives the carrying tray slider 332 to move on the carrying tray slide rail 330. In this way, the driving of the carrying tray 1410 by the carrying tray power module 310 is realized.

In some embodiments, the carrying tray motor 312 is a stepping motor, and the stepping motor is fixed on the bottom wall 1102 of the housing, the carrying tray transmission module 320 further comprises a carrying tray sliding table 322 and a carrying tray screw 324, the carrying tray sliding table 322 is coaxially connected to the rotor of carrying tray motor 312 by a carrying tray screw 324, the carrying tray sliding table 322 is fixedly connected to the carrying tray slider 332, and the extension direction of the screw 324 is parallel to the extension direction of the carrying tray slide rail 330. By providing a stepping motor, a sliding table, and a screw structure, an efficient, compact, stable, and cost-efficient driving structure of the carrying tray 1410 by the carrying tray power module 310 is realized.

In some embodiments, the carrying tray driving section 300 further comprises a first carrying tray stop 342 and a second carrying tray stop 344 on both sides of the carrying tray sliding table 322, and the carrying tray screw 324 passes through the first carrying tray stop 342 and the second carrying tray stop 344, and the first carrying tray stop 342 and the second carrying tray stop 344 are fixed on the bottom wall 1102 of the housing. By providing the first carrying tray stop 342 and the second carrying tray stop 344, the moving range of the carrying tray sliding table 322 is limited, and thus the carrying tray 1410 is limited to move between the first position 220 and the second position 210.

Figure 4A:
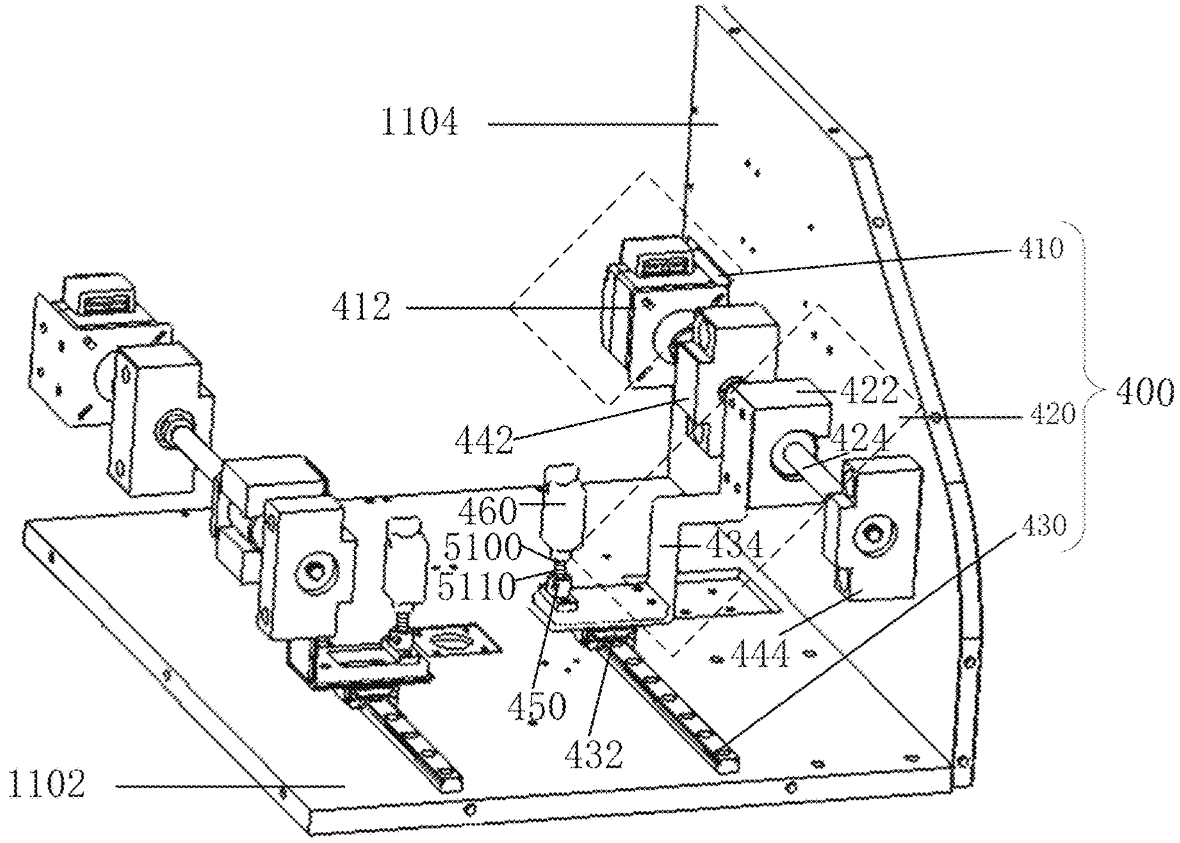
FIG. 4*a* shows a schematic diagram of a fluid driving member and its related structure according to some embodiments of the present disclosure.
Figure 4B:
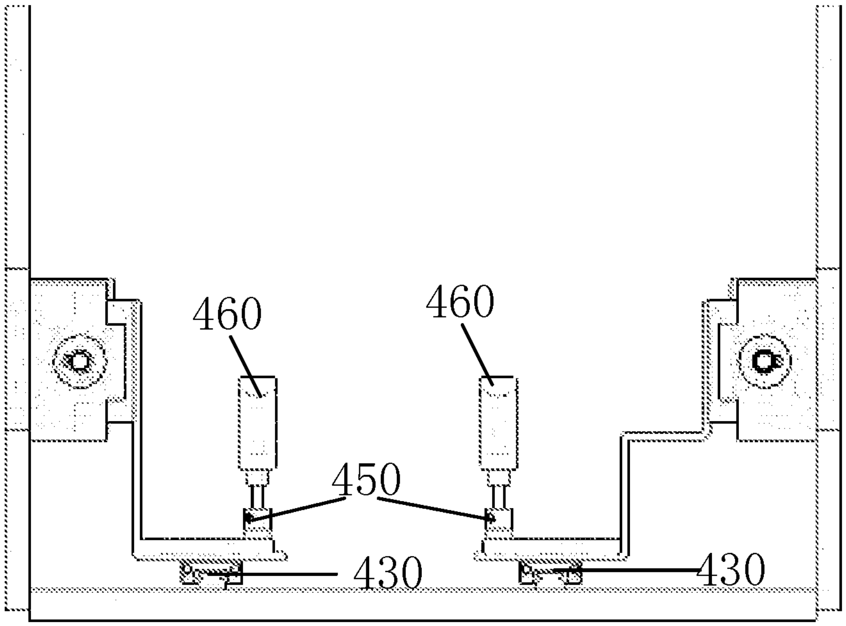
FIG. 4*b* schematically shows a front view of the structure shown in FIG. 4*a;*
Figure 4C:
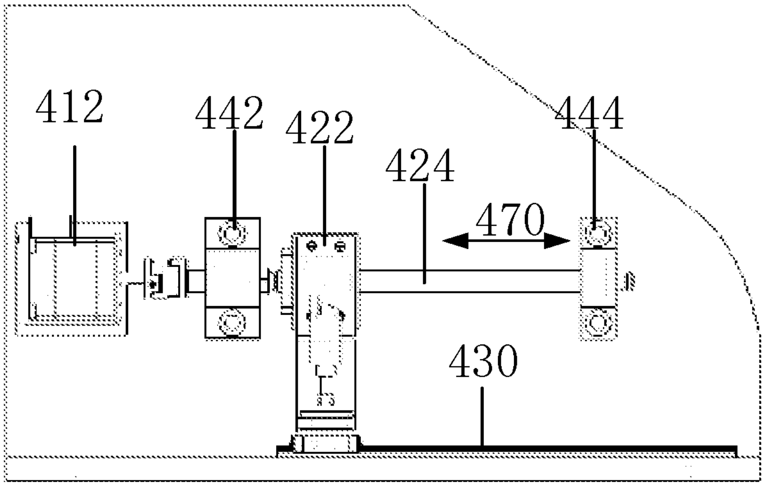
FIGS. 4*c*-4*d* schematically show side views of the structure shown in FIG. 4*a*, in which the fluid driving members are in different positions respectively.
Figure 4D:
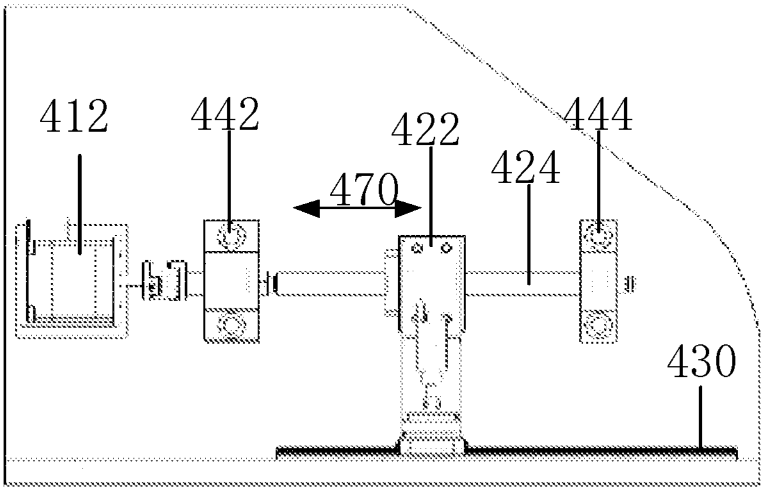

FIG. 4*a* shows a schematic diagram of a fluid driving member and its related structure according to some embodiments of the present disclosure. FIG. 4*b* schematically shows a front view of the structure shown in FIG. 4*a*. FIGS. 4*c*-4*d* schematically show side views of the structure shown in FIG. 4*a*, in which the fluid driving members are in different positions respectively. In some embodiments, as shown in FIGS. 4*a*-4*d*, the fluid driving member 180 comprises a fluid driving member driving section 400 and a first movement module 450, the fluid driving member driving section 400 is configured to drive the first movement module 450 to move between a third position and a fourth position in the first direction 470, and the third position and the fourth position respectively correspond to the end positions of the two ends of the reciprocating movement of the first movement module 450 in the first direction 470 when the device 100 drives the fluid of the microfluidic chip 145. In this way, the movement of the first movement module 450 between the third position and the fourth position is realized, which facilitates the driving of the fluid of the microfluidic chip. Exemplarily, the movement of the fluid driving member is controlled by the instruction of the controller 190. By moving the first movement module 450 between the third position and the fourth position in the first direction 470, the fluid in the microfluidic chip 145 may be driven, for example, by air pressure.

Refer to FIGS. 4*a*-4*c*, in some embodiments, the fluid driving member driving section 400 comprises a fluid driving member power module 410, a fluid driving member transmission module 420, and a fluid driving member slide rail 430, the fluid driving member transmission module 420 is connected to the first movement module 450, the fluid driving member slide rail 430 is fixed to the bottom wall 1102 of the housing, and the fluid driving member power module 410 drives the fluid driving member transmission module 420 to drive the first movement module 450 to move on the fluid driving member slide rail 430. In this way, the movement of the first movement module 450 between the third position and the fourth position is realized. Wherein, in FIGS. 4*c*-4*d*, the first movement module 450 is in different positions between the third position and the fourth position, respectively.

In some embodiments, the fluid driving member power module 410 comprises a fluid driving member motor 412, the fluid driving member transmission module 420 comprises a fluid driving member slider 432 that moves on the fluid driving member slide rail 430 and a fluid driving member connector 434, the fluid driving member slider 432 is fixedly connected to the first movement module 450 through the fluid driving member connector 434, and the fluid driving member motor 412 drives the fluid driving member slider 432 to move on the fluid driving member slide rail 430. In this way, the driving of the first motion module 450 by the fluid driving member power module 410 is realized.

In some embodiments, the fluid driving member motor 412 is a stepping motor, and the stepping motor is fixed on the side wall 1104 of the housing, the fluid driving member transmission module 420 further comprises a fluid driving member sliding table 422 and a fluid driving member screw 424, the fluid driving member sliding table 422 is coaxially connected to the rotor of the fluid driving member motor 412 by the fluid driving member screw 424, the fluid driving member sliding table 422 is fixedly connected to the fluid driving member slider 432, and the extension direction of the screw 424 is parallel to the extension direction of the fluid driving member sliding rail 430. By providing a stepping motor, a sliding table, and a screw structure, an efficient, compact, stable, and cost-efficient driving structure of the first motion module 450 from the fluid driving member power module 410 is realized.

In some embodiments, the fluid driving member driving section 400 further comprises a first fluid driving member stop 442 and a second fluid driving member stop 444 located on both sides of the fluid driving member sliding table 422, and the fluid driving member screw 424 passes through the first fluid driving member stop 442 and the second fluid driving member stop 444, and the first fluid driving member stop 442 and the second fluid driving member stop 444 are fixed on the side wall 1104 of the housing. By providing the first fluid driving member stop 442 and the second fluid driving member stop 444, the movement range of the fluid driving member sliding table 422 is limited, and the first movement module 450 is limited to move between the third position and the fourth position.

In some embodiments, the fluid driving member 180 further comprises a second movement module 460, the second movement module 460 is configured to engage with the microfluidic chip 145 when the microfluidic chip 145 is carried on the carrying tray 1410 and the carrying tray 1410 is in the first position 220, and the second movement module 460 moves with the first movement module 450 in the first direction 470. By providing the second movement module 460, and making the second movement module 460 engage with the microfluidic chip 145 and the second movement module 460 move with the first movement module 450 in the first direction 470, it is possible to realize the control of the microfluidic chip 145 in the drive of the fluid.

Figure 5A:
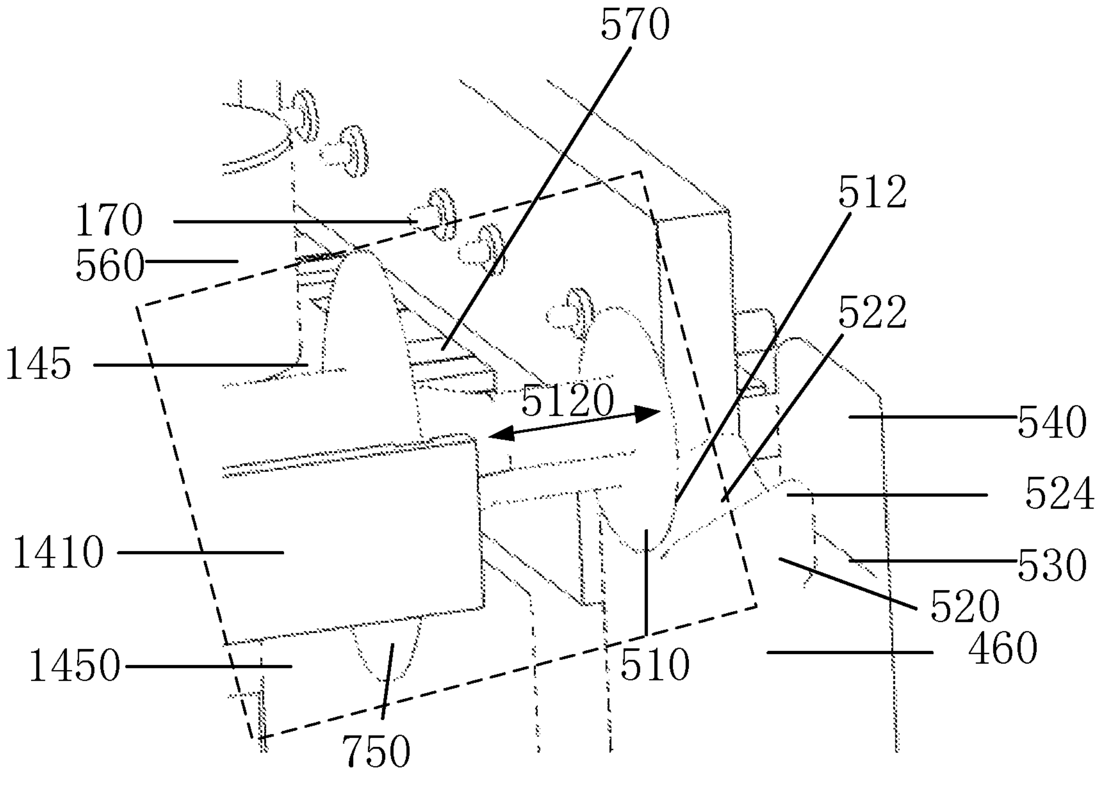
Figure 5B:
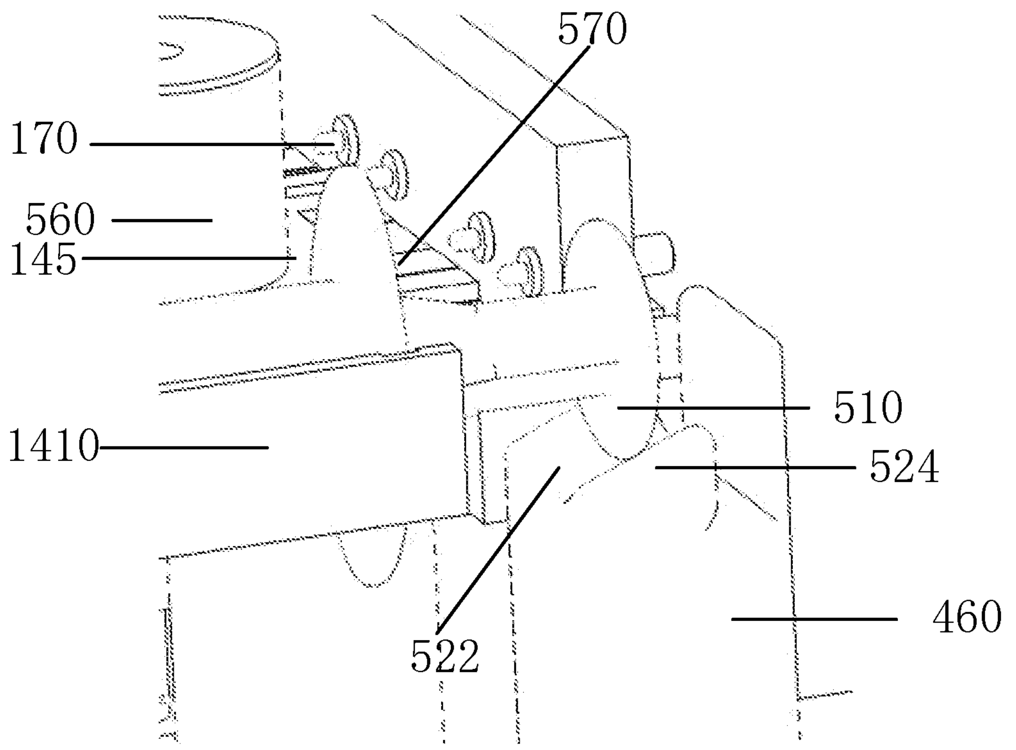
Figure 5C:
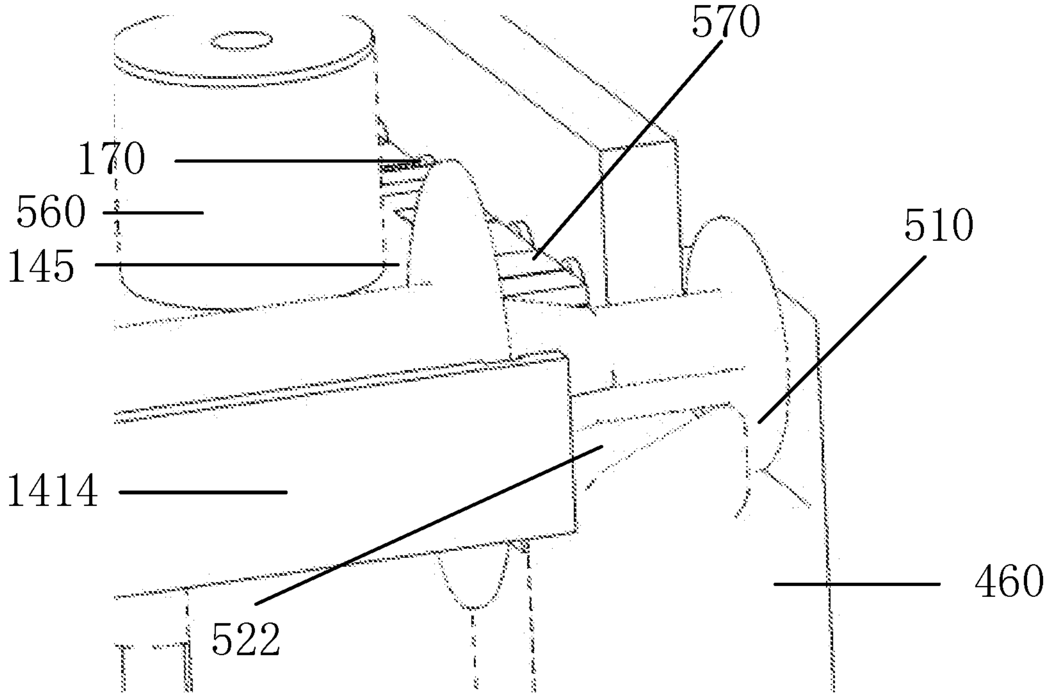
Figure 5D:
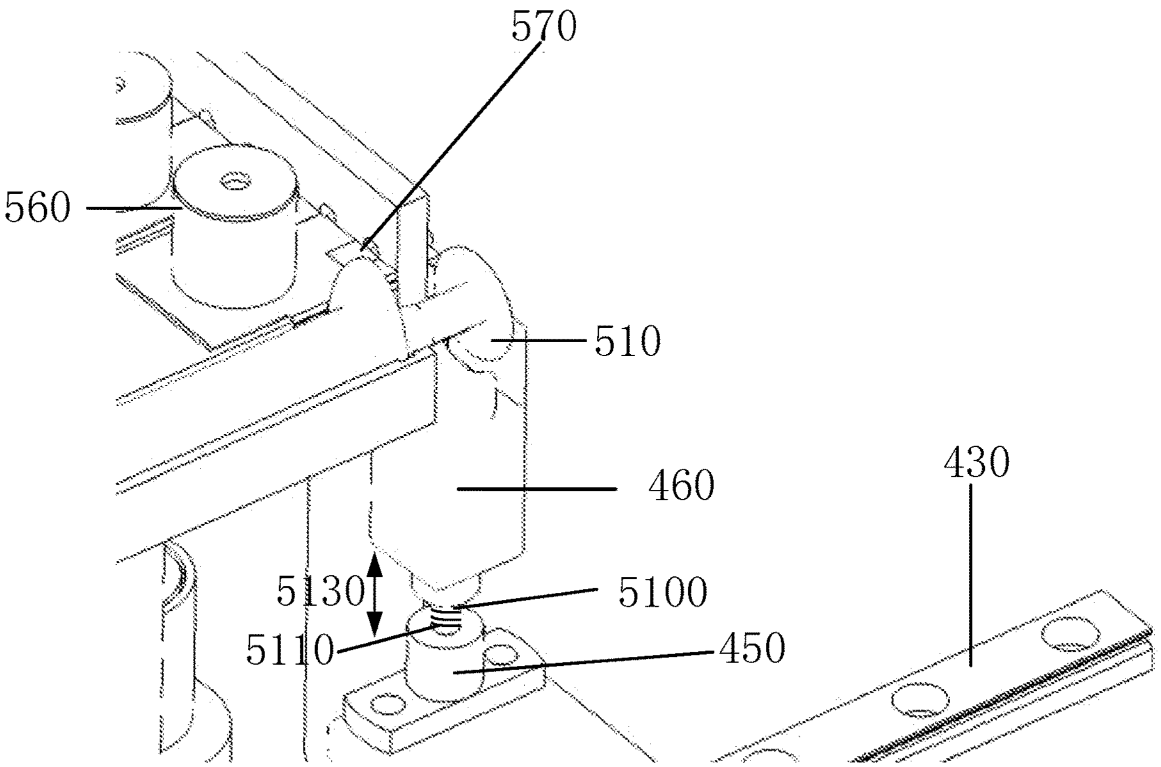
Figure 5E:
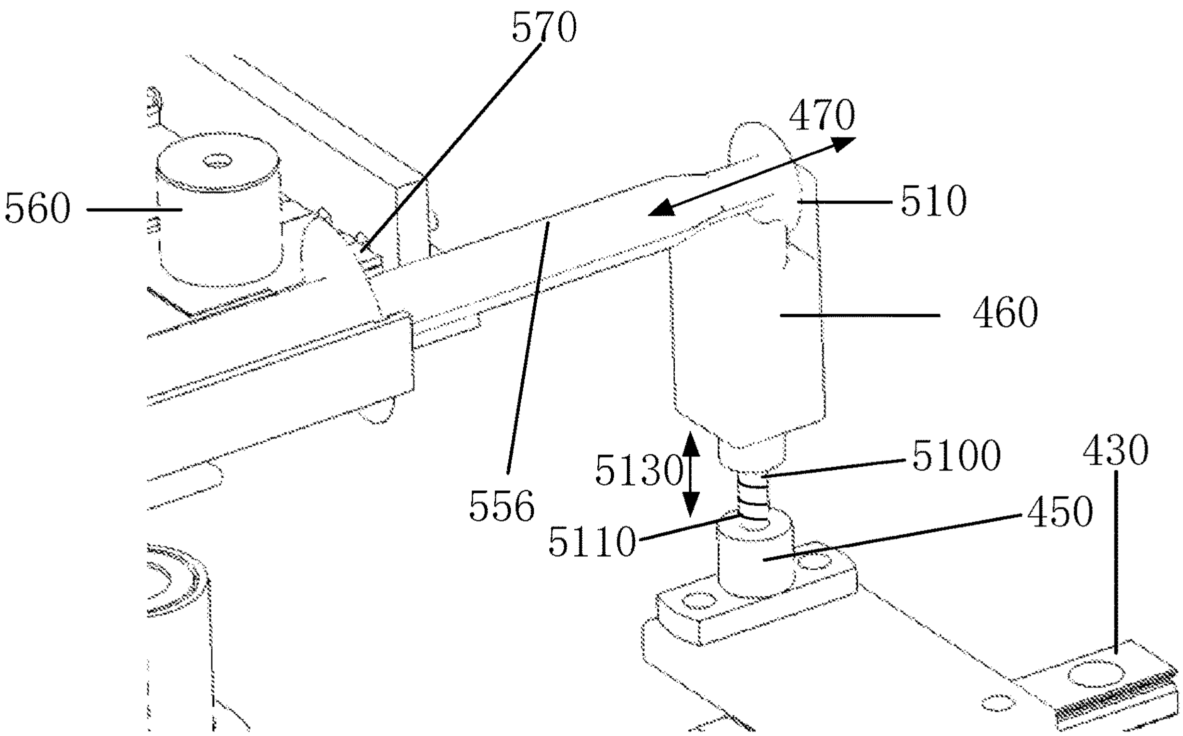
Figure 5F:
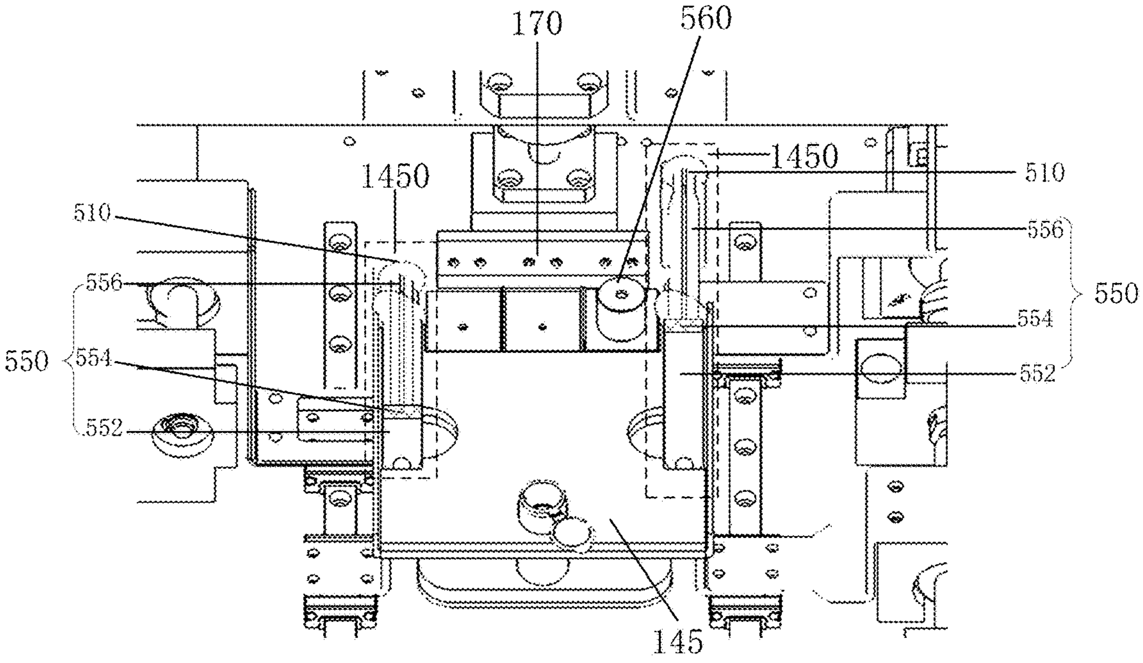
Figure 5G:
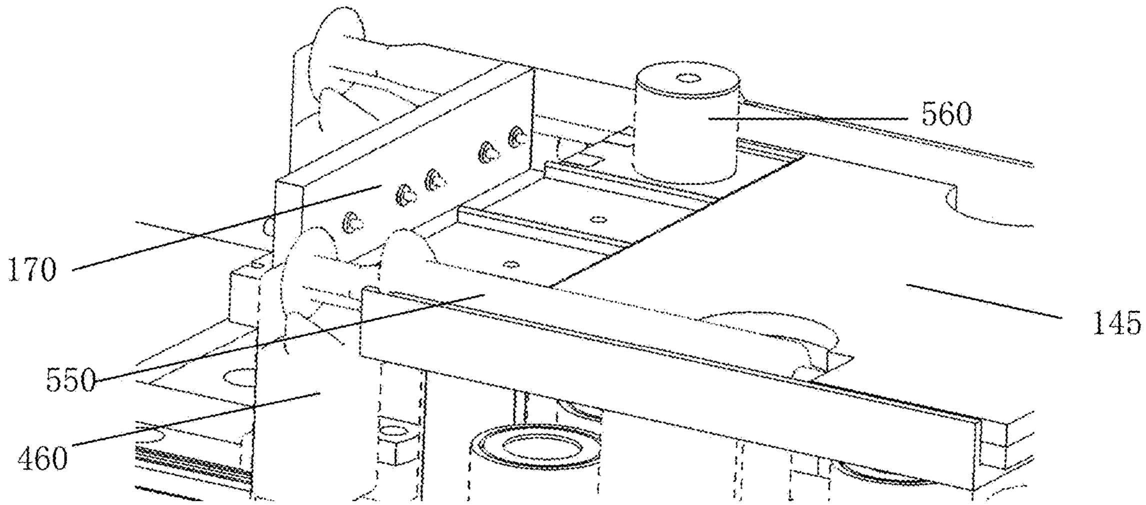

FIGS. 5*a*-5*e* show partial structural schematic diagrams of a device for driving a microfluidic chip according to some embodiments of the present disclosure, in which FIGS. 5*a*-5*c* are respectively at different stages when the carrying tray 1410 moves from the second position 210 to the first position 220, the first movement module 450 is in the third position in FIGS. 5*a*-5*d*, and the first movement module 450 is in the fourth position in FIG. 5*e*. FIGS. 5*f*-5*g* respectively show schematic diagrams of the device for driving the microfluidic chip and the partial structure of the microfluidic chip according to some embodiments of the present disclosure (it should be understood that for clarity of illustration, in FIGS. 5*f*-5*g*, the microfluidic chip 145 and the releasing member 170 are shown as separate).

Refer to FIGS. 4*a*-5*g*, in some embodiments, the microfluidic chip 145 comprises a chip driving member 1450, the chip driving member 1450 comprises a first plug-in block 510, and the second movement module 460 comprises: a first protrusion 520, the first protrusion 520 comprising an inclined surface 522, wherein when the microfluidic chip 145 is carried on the carrying tray 1410 and the carrying tray 1410 is in the second position 210, the inclined surface 522 and the end surface 512 of a first plug-in block 510 close to the inclined surface 522 is opposite to each other; a first slot 530, wherein when the microfluidic chip 145 is carried on the carrying tray 1410 and the carrying tray 1410 is in the second position 210, the first slot 520 is located at side of the first protrusion 520 away from the end surface 512; and a second protrusion 540, the second protrusion 540 being located on a side of the first slot 530 away from the first protrusion 520, and wherein, the first plug-in block 510 is configured to move in a second direction 5120 when the carrying tray 1410 moves between the second position 210 and the first position 220, the second direction 5120 being in the same plane as the extension direction of the inclined surface 522 and neither parallel nor perpendicular to the extension direction of the inclined surface 522, wherein, the fluid driving member 180 further comprises: a shaft 5100, the first motion module 450 is coaxially connected to the second movement module 460 by the shaft 5100, the first motion module 450 is slidable in a third direction 5130 relative to the shaft 5100, and the third direction 5130 is in a plane defined by the second direction 5120 and the extension direction of the inclined surface 522; and an elastic member 5110 that surrounds the shaft 5100, and the elastic member 5110 is between the first movement module 450 and the second movement module 460. The elastic member 5110 is configured to deform in the third direction 5130 in response to the compression of the second movement module 460 in the third direction 5130 and to generate a resilient force opposite to the deformation direction when deformed.

In some embodiments, when the first movement module 450 is in the third position (as shown in FIGS. 5*a*-5*d*), as the carrying tray 1410 moves from the second position 210 to the first position 220, since the second direction 5120 in which the first plug-in block 510 moves is in the same plane as the extension direction of the inclined surface 522 and neither parallel nor perpendicular to the extension direction of the inclined surface 522, the first plug-in block 510 of the microfluidic chip 145 may be sliding along the extension direction of the inclined surface 522 to apply pressure to the second movement module 460 to make the second movement module 460 move downward along the third direction 5130, thereby compressing the elastic member 5110. When the carrying tray 1410 reaches the first position 220, the first plug-in block 510 of the microfluidic chip 145 enters the first slot 530, thereby losing the pressure on the second movement module 460. The second movement module 460 rebounds upward in the third direction 5130 due to the resilience of the elastic component 5110, thus the second movement module 460 may be engaged with and the first plug-in block 510 of the microfluidic chip 145. In the subsequent driving process, in response to the instruction of the controller 190 and the drive of the driving member driving section 400, the first movement module 450 moves in the first direction 470 between the third position and the fourth position. Since the second movement module 460 may only move in the third direction 5130 relative to the first movement module 450, the movement of the first movement module 450 between the third position and the fourth position may drive the second movement module 460 to move together with the first movement module 450, to apply a force to the first plug-in block 510 through the first protrusion 520 or the second protrusion 540 to pull and push the first plug-in block 510 of the microfluidic chip 145 to move in the first direction 470 (as shown in FIG. 5*e*), and the driving and mixing operations of the fluid in the microfluidic chip 145 are further realized. The structure of the first movement module 450, the second movement module 460 and their related structures are simple and compact, which improves the portability of the device 100 for driving the microfluidic chip 145.

In some embodiments, the second direction 5120 is parallel to the first direction 470, the third direction 5130 is perpendicular to the first direction 470, and when the microfluidic chip 145 is carried on the carrying tray 1410 and the carrying tray 1410 is in the second position 210, the end surface 512 at the side of the first plug-in block 510 close to the inclined surface 522 is perpendicular to the first direction 470. In this way, it facilitates the first plug-in block 510 to slide along the extension direction of the inclined surface 522, thereby applying pressure to the second movement module 460.

In some embodiments, the carrying tray slide rail 330 and the fluid driving member slide rail 430 may share a same slide rail. In this way, the structure is further simplified.

In some embodiments, as shown in FIG. 5*a*, the first protrusion 520 further comprises: retaining walls 524 located on both sides of the inclined surface 522 along the extension direction of the inclined surface 522. By arranging the retaining walls, the first plug-in block 510 may be prevented from slipping off the inclined surface 522 when pressure is applied to the second movement module 460, thereby increasing the reliability and stability of the system.

In some embodiments, referring to FIGS. 5*a*-5*g*, the chip driving member 1450 further comprises a cylindrical syringe 550, the cylindrical syringe 550 comprising: a cylinder 552, a piston 554 configured to move within the cylinder 552, and a push rod 556 configured to control the piston 554, and the push rod 556 is fixedly connected with the first plug-in block 510. Through the cylindrical syringe structure, the second movement module 460 may apply a force to the first plug-in block 510 through the first protrusion 520 or the second protrusion 540, thereby pulling and pushing the push rod 556 of the cylindrical syringe 550, which may further drive the fluid in the cylindrical syringe 550 into other areas of the microfluidic chip and performing mixing and other operations to the fluid.

It should be understood that, the specific number of chip driving members 1450 may be set according to actual needs. Exemplarily, referring to FIGS. 1*a*-1*c* and 4*a*-5*g*, the microfluidic chip 145 comprises two sets of chip drive members 1450, and the two sets of chip drive members 1450 are respectively located on both sides of the microfluidic chip 145, the device 100 comprises two sets of fluid driving members 180 configured to control the two sets of chip drive members 1450 respectively, and the two sets of fluid driving members 180 are respectively located on both sides of the device 100, the two sets of fluid driving members 180 comprise two fluid driving member slide rails 430, and the orthographic projection of the carrying tray 1410 on the bottom wall 1102 of the housing is between the orthographic projections of the two fluid driving member slide rails 430 on the bottom wall 1102 of the housing.

In some embodiments, referring to FIG. 3*a*, in the case where the microfluidic chip 145 comprises a cylindrical syringe 550, the carrying tray 1410 may comprise a recess 740 that matches the shape and position of the cylindrical syringe 550. In this way, the recess 740 may be used to accommodate the cylindrical syringe 550, which further plays a role in positioning and makes the structure more compact.

In some embodiments, referring to FIGS. 5*a*-5*g*, the microfluidic chip 145 further comprises: a reservoir 560; and a control electrode 570 for controlling the release of the reagent from the reservoir 560, wherein, the releasing member 170 is configured to be electrically connected with the control electrode 570 when the microfluidic chip 145 is carried on the carrying tray 1410 and the carrying tray 1410 is in the first position 220. In this way, by electrically connecting the releasing member 170 to the control electrode 570, the release of the reagent from the reservoir 560 may be controlled.

Figure 6A:
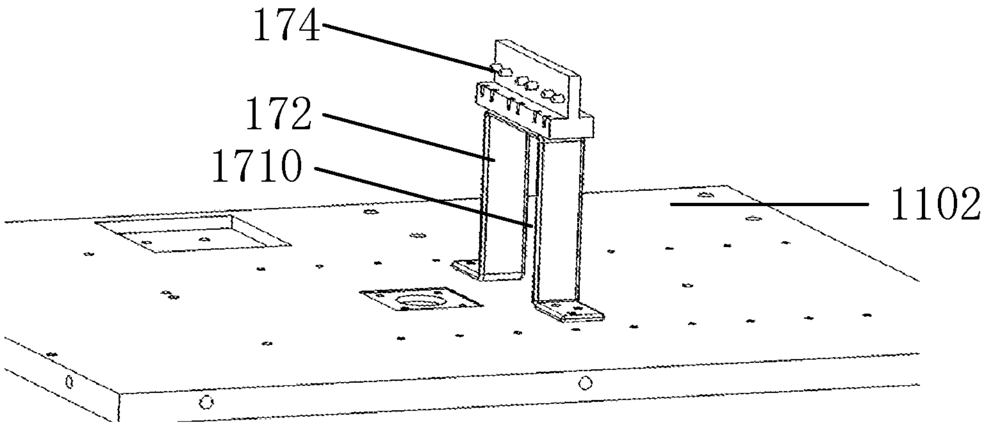
FIG. 6*a* shows a schematic diagram of a releasing member and its related structure according to some embodiments of the present disclosure.
Figure 6B:
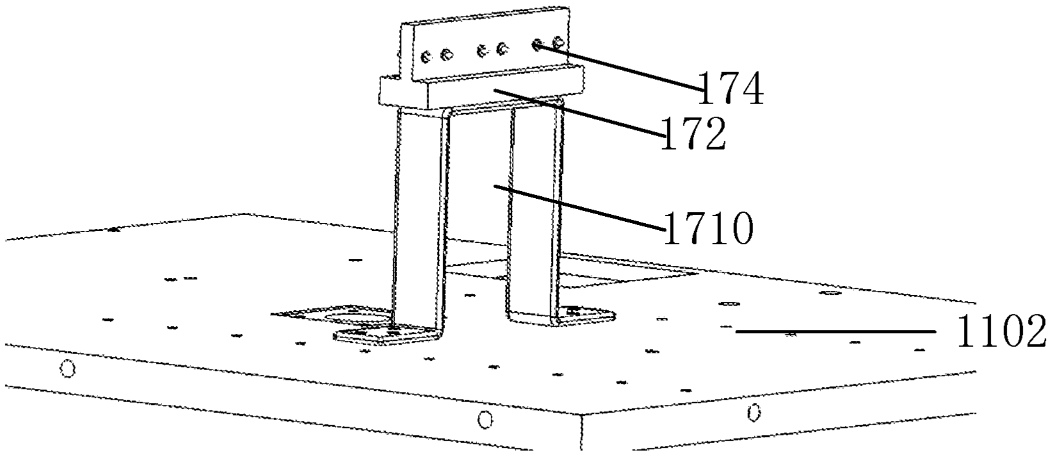
FIG. 6*b* schematically shows a perspective view of the structure shown in FIG. 6*a* from a different perspective.
Figure 6C:
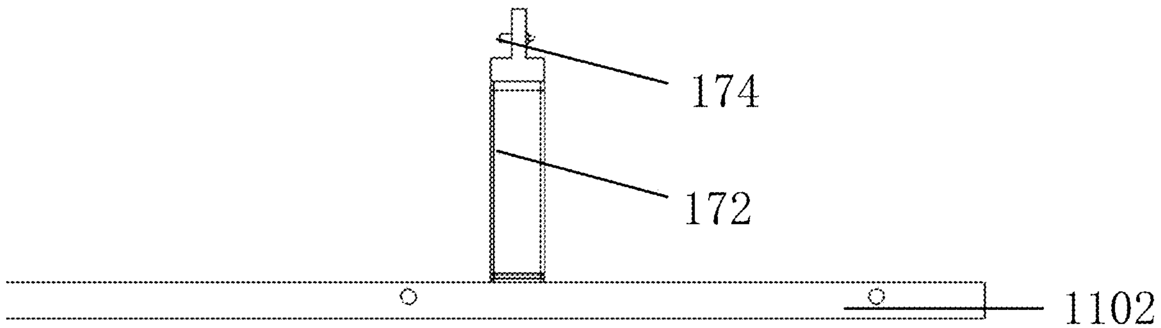
FIG. 6*c* schematically shows a side view of the structure shown in FIG. 6*a;*

FIG. 6*a* shows a schematic diagram of a releasing member 170 and its related structure according to some embodiments of the present disclosure. FIG. 6*b* schematically shows a perspective view of the structure shown in FIG. 6*a* from a different perspective. FIG. 6*c* schematically shows a side view of the structure shown in FIG. 6*a* (where the electrode contacts are shown in a compressed state). Referring to FIGS. 5*a*-5*g* and 6*a*-6*c*, in some embodiments, the releasing member 170 comprises: a releasing member supporting seat 172, the releasing member supporting seat 172 being fixed on the bottom wall 1102 of the housing; and an electrode contact 174 installed on the releasing member supporting seat 172; wherein the electrode contact 174 is electrically connected to the control electrode 570 when the microfluidic chip 145 is carried on the carrying tray 1410 and the carrying tray 1410 is in the first position 220. In this way, by electrically connecting the electrode contact 174 and the control electrode 570, the release of the reagent from the reservoir 560 may be controlled. The electrode contact 174 is simple and compact, which improves the portability of the device 100 for driving the microfluidic chip 145.

In some embodiments, the electrode contact 174 comprises a pogo pin connector. In this way, the stable electrical connection between the electrode contact 174 and the microfluidic chip 145 may be ensured by the resilient force of the spring, and the operation is simple and the structure is compact.

For example, as shown in FIGS. 5*a*-5*c*, when the carrying tray 1410 moves from the second position 220 to the first position 210, the control electrode 570 of the microfluidic chip 145 is in contact with the electrode contact 174 to form an electrical connection (for example, the circuit is closed), so that the controller 190 provides the required voltage to the microfluidic chip 145 through the electrode contact 174, and sends out corresponding instructions, for example, to control the release of the reagent in the liquid reservoir 560. In some embodiments, as shown in FIGS. 5*c*-5*e*, during the process in which the device 100 for driving the microfluidic chip 145 drives the fluid of the microfluidic chip 145, the control electrode 570 and the electrode contact 174 are kept electrically connected. Exemplarily, the number of electrode contacts 174 is 6-16.

In some embodiments, referring to FIGS. 3*a*-3*c* and 5*a*, the microfluidic chip 145 further comprises a second plug-in block 750, and the carrying tray 1410 further comprises a second slot 730 matching the shape and position of the second plug-in block 750. In this way, the second plug-in block 750 is configured to be inserted into the second slot 730 when the microfluidic chip 145 is carried on the carrying tray 1410. When the carrying tray 1410 moves to the first position 220 and the microfluidic chip 145 is electrically connected to the electrode contacts 174, it may be ensured that there will be no relative movement between the microfluidic chip 145 and the carrying tray 1410, thereby ensuring a stable electrical connection and positioning.

It should be understood that, in some embodiments, the microfluidic chip may also comprise a reaction zone (not shown) for reagent reaction, a waste liquid chamber (not shown) for containing waste liquid, and a collection tank for containing products (not shown), and flow channels (not shown) for fluid to flow, etc.

Figure 7A:
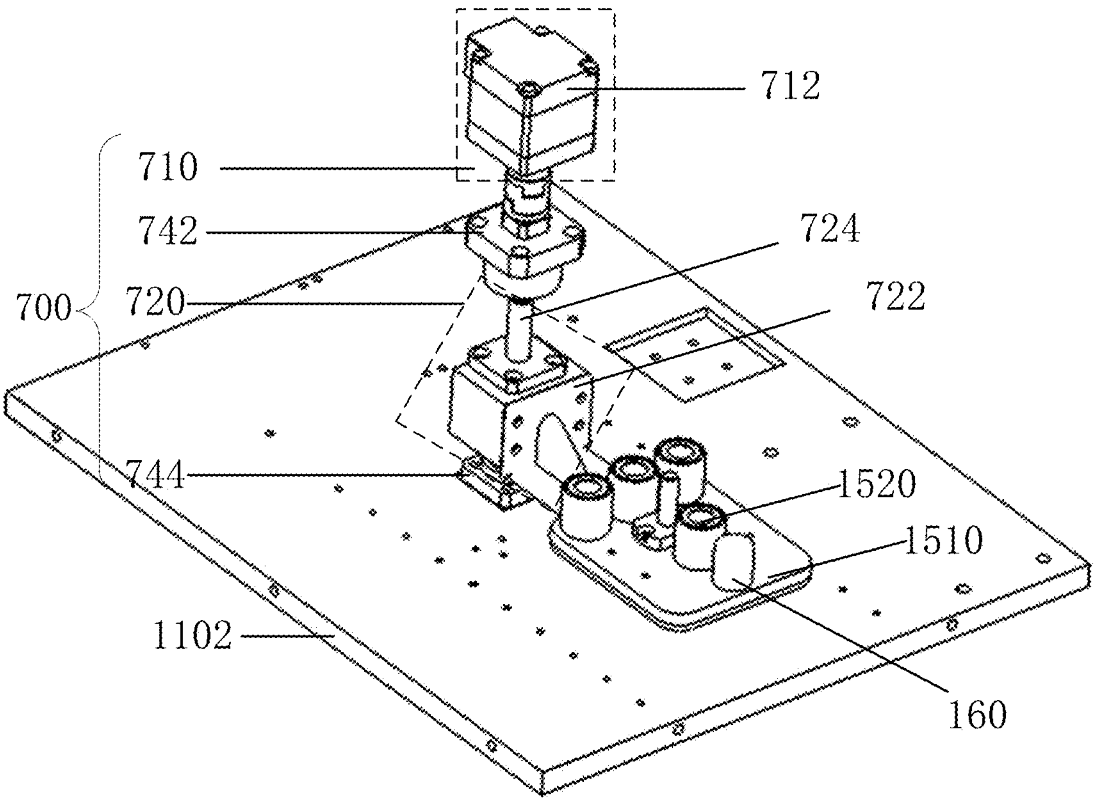
FIG. 7*a* shows a schematic diagram of a valve control member and its related structure according to some embodiments of the present disclosure.
Figure 7B:
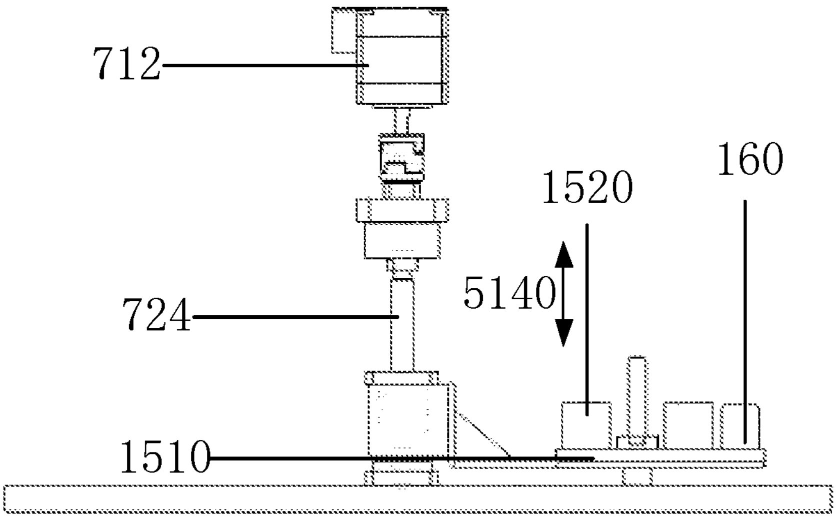
FIGS. 7*b*-7*c* respectively show schematic side views of the structure shown in FIG. 7*a;*
Figure 7C:
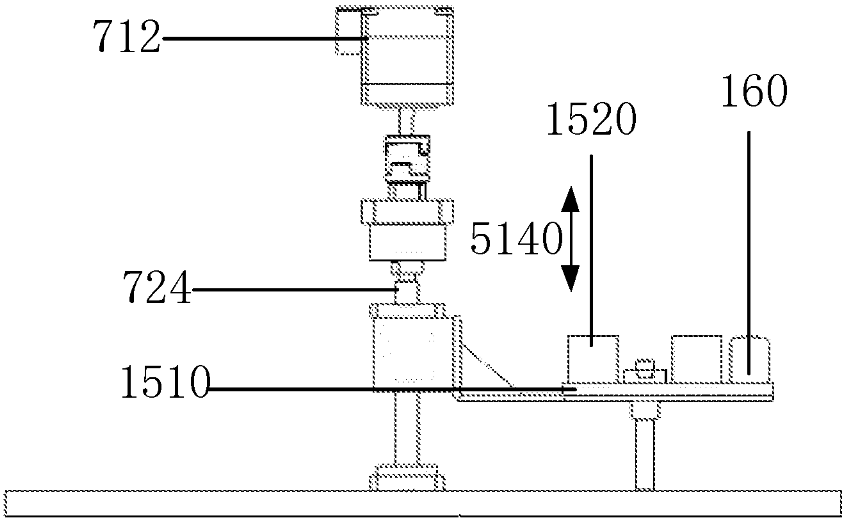
Figure 8A:
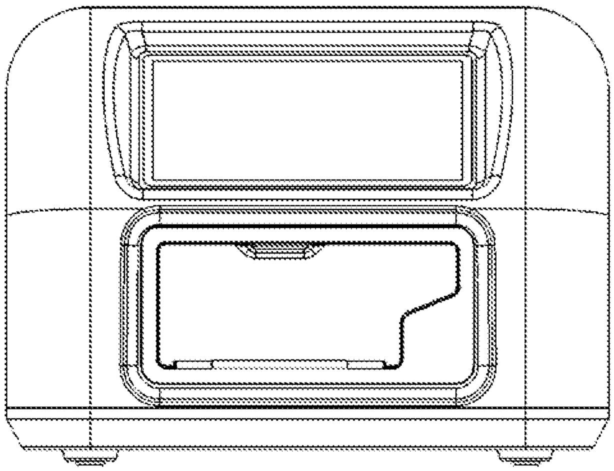
FIGS. 8*a*-8*f* respectively show six-view schematic diagrams of a nucleic acid extractor according to some embodiments of the present disclosure.
Figure 8B:
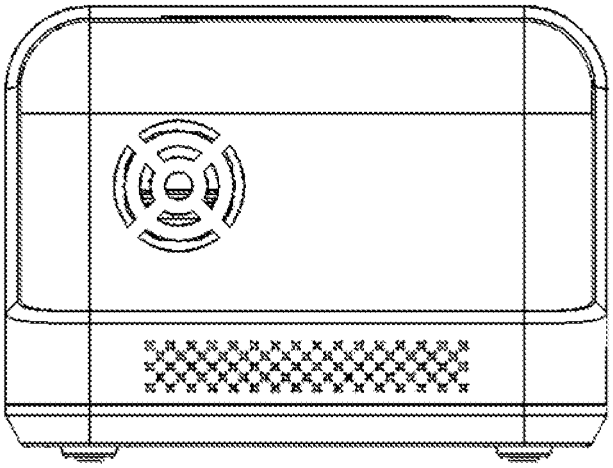
Figure 8C:
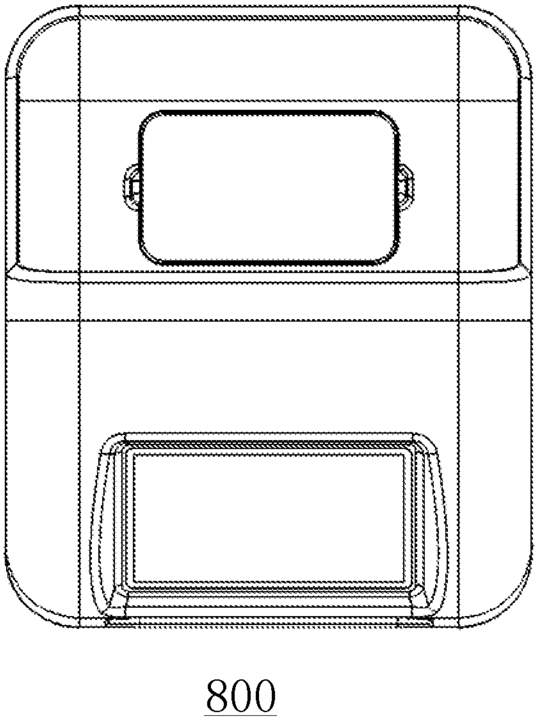
Figure 8D:
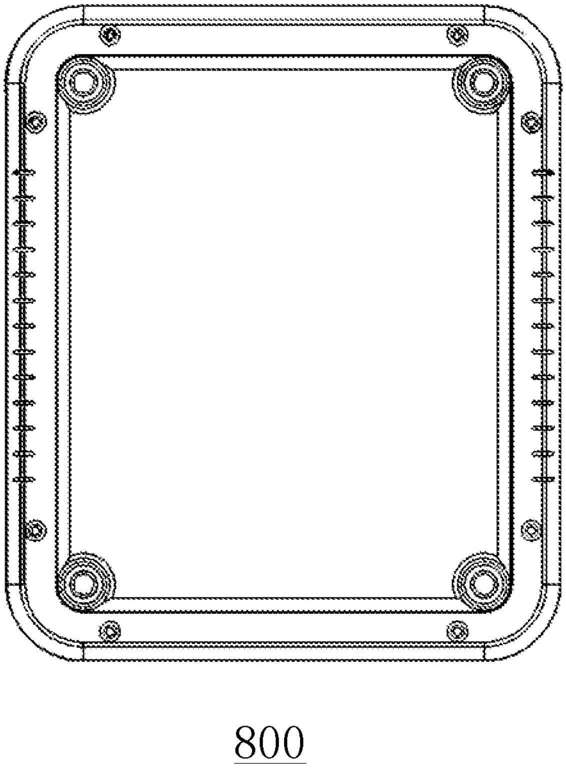
Figure 8E:
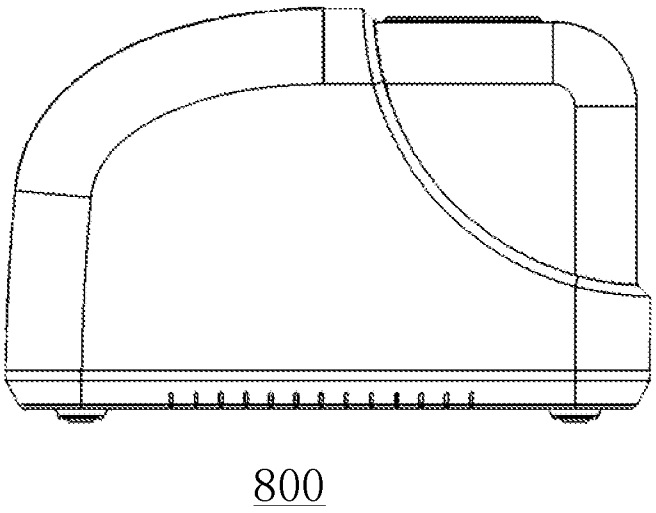
Figure 8F:
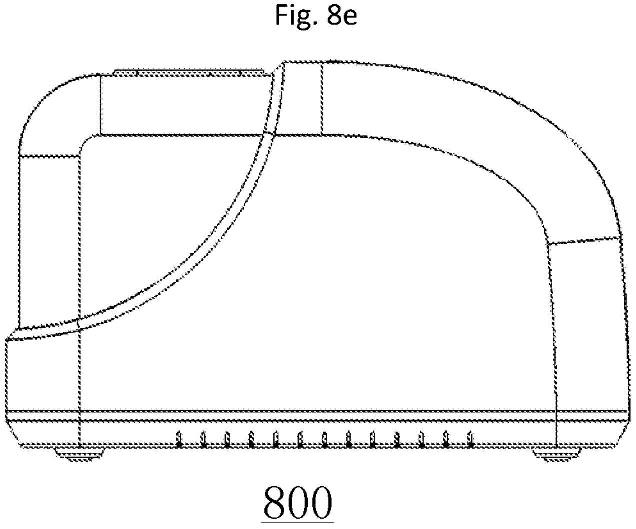

FIG. 7*a* shows a schematic diagram of a valve control member 150 and its related structure according to some embodiments of the present disclosure. FIGS. 7*b*-7*c* respectively show schematic side views of the structure shown in FIG. 7*a*, in which the valve control tray is in different positions. In some embodiments, referring to FIGS. 7*a*-7*c*, the valve control member 150 comprises: a valve control tray 1510; a valve control valve 1520, the valve control valve 1520 being located on the valve control tray 1510 and configured to control the opening and closing of the flow channel in the valve control area, and a valve-controlled tray driving section 700 configured to drive the valve control tray 1510 to move between a fifth position and a sixth position in a fourth direction 5140, and the fifth position and the sixth position respectively correspond to the end positions of the two ends of the reciprocating movement of the valve control tray 1510 when the device 100 drives the microfluidic chip 145. In this way, it is realized that the valve control tray 1510 moves between the fifth position and the sixth position, thereby driving the valve control valve 1520 to approach and move away from the valve control area.

In some embodiments, the valve-controlled tray driving section 700 comprises a valve control tray power module 710 and a valve control tray transmission module 720, the valve control tray transmission module 720 is connected to the valve control tray 1510, and the valve control tray power module 710 drives the valve control tray transmission module 720 to drive the valve control tray 1510 to move between the fifth position and the sixth position in a fourth direction 5140. In this way, the valve control tray 1510 moves between the fifth position and the sixth position. Wherein, the valve control tray 1510 is in different positions between the fifth position and the sixth position in FIGS. 7*b*-7*c*.

Referring to FIGS. 1*b*-1*c* and 7*a*-7*c*, in some embodiments, the valve control tray power module 710 comprises a valve control member motor 712, the valve control member motor is a stepping motor, and the stepping motor is fixedly connected to the side wall 1104 of the housing. The valve control tray transmission module 720 further comprises a valve control tray sliding table 722 and a valve control tray screw 724, the valve control tray sliding table 722 is coaxially connected to the rotor of the valve control member motor 712 by the valve control tray screw 712, the valve control tray sliding table 722 is fixedly connected to the valve control tray 1510, and the extension direction of the valve control tray screw 724 is parallel to the fourth direction 5140. By providing a stepping motor, a sliding table and a screw structure, an efficient, compact, stable and cost-efficient driving structure of the valve control tray 1510 by the valve control tray power module 710 is realized.

In some embodiments, the valve control tray driving section 700 further comprises a first valve control tray stop 742 and a second valve control tray stop 744 located on both sides of the valve control tray sliding table 722, the valve control tray screw 724 passes through the first valve control tray stop 742 and the second valve control tray stop 744, and the first valve control tray stop 742 is fixed on the side wall 1104 of the housing, the second valve control tray stop 744 is fixed on the bottom wall 1102 of the housing. By providing the first valve control tray stop 742 and the second valve control tray stop 744, the movement range of the valve control tray sliding table 722 is limited, and the valve control tray 1510 is limited to move in the fourth direction 5140 between the fifth position and the sixth position.

In some embodiments, referring to FIGS. 1*b*-1*c* and FIGS. 7*a*-7*c*, the carrying tray slide rail 330 comprises two rails 3302, 3304, and the orthographic projection of the valve control member 150 on the bottom wall 1102 of the housing is located between the orthographic projections of the two rails 3302, 3304 on the bottom wall 1102 of the housing, and the valve control tray 1510 is located between the first position 220 of the carrying tray 1410 and the bottom wall 1102 of the housing. In this way, the structure of the entire device is more compact, and the moving distance of the valve control tray 1510 is reduced.

In some embodiments, the valve control area comprises a thin film valve (not shown) configured to control the opening and closing of the flow channel, and the valve control valve 1520 is configured to control the thin film valve in response to the power supply state. The thin film valve may be used to open and close the flow channel.

In some embodiments, the valve control valve 1520 comprises a solenoid valve (not shown), and the solenoid valve comprises a de-energized electromagnet. The solenoid valve is configured to control the thin film valve to descend or bounce in response to the power supply state, to close or open the flow channel in the microfluidic chip 145. The magnetism of the de-energized electromagnet appears or disappears in response to the power supply state, thereby controlling the thin film valve to descend or bounce. In this way, the valve control member 150 has a simple and compact structure, which improves the portability of the device 100 for driving the microfluidic chip 145.

In some embodiments, referring to FIGS. 1*a*-2*b*, a first through hole 810 is provided on the bottom wall 1412 of the carrying tray, wherein, when the microfluidic chip 145 is carried on the carrying tray 1410, the projection of the valve control area on the carrying tray 1410 along the fourth direction 5140 at least partially overlaps the first through hole 810. By providing the first through hole, the valve control valve 1520 may be brought closer to the valve control area, thereby improving the valve control effect.

For example, referring to FIGS. 1*a*-2*b*, the cross section of the first through hole 810 in a plane parallel to the bottom wall 1412 of the carrying tray has the shape of three circles communicating with each other, so that the first through hole 810 may accommodate three valve control valves 1520.

In some embodiments, referring to FIGS. 1*a*-2*b*, the device 100 further comprises: a temperature control member 160 configured to control the temperature of the temperature control area of the microfluidic chip 145 when the temperature control area is within the temperature control range of the temperature control member 160. By providing the temperature control member 160, the temperature of the temperature control area of the microfluidic chip 145 may be controlled, which expands the use environment and reaction conditions of the microfluidic chip 145 and the device 100 for driving the microfluidic chip.

In some embodiments, when the device 100 drives the fluid of the microfluidic chip 145, the valve control tray 1510 is in the sixth position, and when the carrying tray 1410 is in a position other than the first position 220, the valve control tray 1510 is in the fifth position, when the valve control tray 1510 is in the sixth position, the valve control valve 1520 is inserted into the first through hole 810 and the end surface 1522 of the valve control valve 1520 away from the valve control tray 1510 and the surface of the bottom wall 1412 of the carrying tray away from the valve control tray 1510 are flush (as shown in FIG. 2*b*), and when the valve control tray 1510 is in the fifth position, the distance between the valve control tray 1510 and the carrying tray 1410 is greater than the distance between the valve control tray 1510 and the carrying tray 1410 when the valve control tray 1510 is in the sixth position, and when the valve control tray 1510 is in the fifth position, the end surface 1522 of the valve control valve 1520 away from the valve control tray 1510 is a distance away from the carrying tray 1410. In this way, when the valve control tray 1510 is in the sixth position, the valve control valve 1520 may be close to the valve control area, thereby achieving a good valve control effect; and when the valve control tray 1510 is in the fifth position, the valve control valve 1520 will not interfere with the movement of the carrying tray 1410. The valve control member 150 is simple and compact, which improves the portability of the device 100 for driving the microfluidic chip 145.

In some embodiments, a second through hole 820 is further provided on the bottom wall 1412 of the carrying tray, wherein, when the microfluidic chip 145 is carried on the carrying tray 1410, the projection of the temperature control area of the microfluidic chip 145 on the carrying tray 1410 along the fourth direction at least partially overlaps the second through hole 820. By providing the second through hole, the temperature control member 160 may be brought closer to the temperature control area, thereby improving the temperature control effect.

In some embodiments, the temperature control member 160 is installed on the valve control tray 1510. When the device 100 drives the fluid of the microfluidic chip 145, the valve control tray 1510 is in the sixth position, and when the carrying tray 1410 is in a position other than the first position 220, the valve control tray 1510 is in the fifth position, when the valve control tray 1510 is in the sixth position, the temperature control member 160 is inserted into the second through hole 820 and the end surface 162 of the temperature control member 160 away from the valve control tray 1510 and the surface of the bottom wall 1412 of the carrying tray away from the valve control tray 1510 are flush (as shown in FIG. 2*b*), and when the valve control tray 1510 is in the fifth position, the distance between the valve control tray 1510 and the carrying tray 1410 is greater than the distance between the valve control tray 1510 and the carrying tray 1410 when the valve control tray 1510 is in the sixth position, and when the valve control tray 1510 is in the fifth position, the end surface 162 of the temperature control member 160 away from the valve control tray 1510 is a distance away from the carrying tray 1410. In this way, when the valve control tray 1510 is in the sixth position, the temperature control member 160 may be close to the temperature control area, thereby achieving a good temperature control effect; and when the valve control tray 1510 is in the fifth position, the temperature control member 160 will not interfere with the movement of the carrying tray 1410. The trays corresponding to the temperature control member 160 and the valve control valve 1520 may be the same tray (i.e., the valve control tray 1510), which further saves space and simplifies the structure. The temperature control member 160 is simple and compact, which improves the portability of the device 100 for driving the microfluidic chip 145

For example, in different situations, the valve control tray 1510 may be in two stations, namely a working station and a non-working station, where in the working station the valve control area of the microfluidic chip 145 is within the threshold range of the valve control valve 1520 and the temperature control area of the microfluidic chip 145 is within the temperature control range of the temperature control member 160. When going to the work station, in response to an instruction from the controller 190, the valve control tray 1510 rises upward in the fourth direction 5140 (refer to FIG. 7*b*). For example, the valve control valve 1520 enters the first through hole 810 of the carrying tray 1410 and the temperature control member 160 enters the second through hole 820 of the carrying tray 1410. In this way, the control of the valve control area by the valve control valve 1520 and the control of the temperature control area by the temperature control member 160 may be realized. When going to the non-working station, in response to the instruction of the controller 190, the valve control tray 1510 drops downward in the fourth direction 5140. Exemplarily, the number of valve control valves 1520 may be 3 to 4.

In some embodiments, the temperature control member 160 may comprise a material that generates heat after being energized. Exemplarily, the temperature control member comprises a PTC heater or a cermet heating element, to provide a required temperature to the temperature control area.

In some embodiments, the temperature control member 160 may further comprise a temperature sensor for sensing the temperature of the temperature control area.

In some embodiments, referring to FIGS. 1*a*-1*c* and FIGS. 6*a*-7*c*, the releasing member supporting seat 172 is provided with a through hole 1710, and the valve control tray 1510 is connected to the valve control tray sliding table 722 via the through hole 1710. In this way, space is further saved and the structure is more compact.

It should be understood that, the device 100 for driving the microfluidic chip may also adopt a flip-top structure. In some embodiments, when the device for driving the microfluidic chip adopts a flip-top structure, part of the structure of the valve control member 150 does not need to move, for example, the valve control valve 1520 may always be held in the first through hole 810, and the temperature control member 160 may always be held in the second through hole 820.

In some embodiments, as shown in FIG. 1*a*, the device 100 further comprises: a display 130 located outside the housing 110, configured to display a driving state or receive a control instruction. The user may send instructions to the controller 190 through the control screen, and may also display the received controller feedback on the control screen, which improves the operation efficiency and facilitates real-time monitoring of the device status.

In some embodiments, the device 100 for driving the microfluidic chip 145 further comprises: other user interfaces located outside the housing 110, such as a mouse, a keyboard, a joystick, etc., which will not be repeated here.

In some embodiments, the controller 190 may be electrically connected to one or more of the user interface 130, the carrying member 140, the valve control member 150, the temperature control member 160, the releasing member 170, and the fluid driving member 180, respectively, so as to send control instruction.

In some embodiments, one or more of the carrying tray 1410 in the first position, the valve control member 150, the temperature control member 160, the releasing member 170, the fluid driving member 180, and the controller 190 may be located inside the housing 110.

For example, as shown in FIGS. 1*a*-1*c*, the carrying tray slide rail may comprise two rails 3302, 3304, and the two rails 3302, 3304 may be fixedly installed on the bottom wall 1102 of the housing. The orthographic projection of the carrying tray on the bottom wall 1102 of the housing may be located between the orthographic projections of the two rails 3302, 3304 on the bottom wall 1102 of the housing. The carrying tray motor, the carrying tray sliding table, the first carrying tray stop and the second carrying tray stop may be coaxially connected by a carrying tray screw, and the carrying tray motor, the first carrying tray stop and the second carrying tray stop may be fixed to the bottom wall 1102 of the housing, and the carrying tray motor, the carrying tray sliding table, the carrying tray screw, the first carrying tray stop and the second carrying tray stop may be located on the same side of the two rails 3302, 3304. In this way, the space utilization rate is improved, the carrying member and its related structure are as compact as possible, the structure is simplified, and the cost is reduced.

For example, as shown in FIGS. 1*a*-1*c*, the carrying tray slide rail and the fluid driving member slide rail may share the same slide rail, that is, share two rails 3302, 3304. In this case, the carrying tray slider and the fluid driving member slider may respectively move within different ranges of a single rail, thereby preventing the carrying tray slider and the fluid driving member slider from conflicting. The two sets of fluid driving members 180 may be located on both sides of the device 100 respectively. The two sets of first movement modules in the two sets of fluid driving members 180 may both be located on the side of the first position of the carrying tray away from the second position. The fluid driving member motor, the fluid driving member sliding table, the first fluid driving member stop, and the second fluid driving member stop in each of the two sets of fluid driving members 180 may be coaxially connected by the fluid driving member screw. The fluid driving member motor, the first fluid driving member stop and the second fluid driving member stop of each set of the fluid driving members 180 of the two sets of fluid driving members 180 may be fixed to the side wall 1104 of the housing. The orthographic projections of the fluid driving member motor, the first fluid driving member stop and the second fluid driving member stop of one group of the fluid driving members 180 of the two sets of fluid driving members 180 on the bottom wall 1102 of the housing may at least partially overlap the orthographic projections of the carrying tray motor, the first carrying tray stop and the second carrying tray stop on the bottom wall 1102 of the housing respectively. The orthographic projections of the two sets of fluid driving member motors, the first fluid driving member stops, and the second fluid driving member stops on the bottom wall 1102 of the housing may all be located outside the orthographic projections of the two rails 3302, 3304 on the bottom wall 1102 of the housing, and the orthographic projections of the two sets of first motion modules on the bottom wall 1102 of the housing may both be located between the orthographic projections of the two rails 3302, 3304 on the bottom wall 1102 of the housing. In this way, the space utilization rate is improved, the fluid driving member and its related structure are as compact as possible, the structure is simplified, and the cost is reduced.

Exemplarily, as shown in FIGS. 1*a*-1*c*, the releasing member 170 may be located on the side of the first position of the carrying tray away from the second position, and the releasing member 170 may be close to the carrying tray in the first position. The releasing member supporting seat may avoid the position of the chip driving member of the microfluidic chip 145, so that the orthographic projection of the releasing member supporting seat on the bottom wall 1102 of the housing may be located between the orthographic projections of the respective movement trajectories of the two sets of first movement modules (that is, movement trajectories between the third position and the fourth position) on the bottom wall 1102 of the housing. In this way, the space utilization rate is improved, the releasing member and its related structure are as compact as possible, the structure is simplified, and the cost is reduced.

Exemplarily, as shown in FIGS. 1*a*-1*c*, the orthographic projection of the valve control member 150 on the bottom wall 1102 of the housing may be located between the orthographic projections of the two rails 3302, 3304 on the bottom wall 1102 of the housing, and the valve control tray may be located between the first position of the carrying tray and the bottom wall 1102 of the housing. The valve control member motor, the valve control tray sliding table and the valve control tray screw, the first valve control tray stop and the second valve control tray stop may be located on the side of the releasing member supporting seat away from the first position of the carrying tray 1410. The releasing member supporting seat may be provided with a through hole, and the valve control tray may be connected to the valve control tray sliding table via the through hole. The valve control member motor and the first valve control tray stop may be fixed to the side walls 1104 of the housing located on both sides of the device 100 through the valve control connector 1106. The controller 190 may be installed on the valve control connector 1106. In this way, the space utilization rate is improved, the valve control member, the temperature control member, the controller and the related structure are as compact as possible, the structure is simplified, and the cost is reduced.

In some embodiments, the device 100 for driving the microfluidic chip 145 is a portable automatic driving device, that is, the device 100 may automatically complete the entire driving process in response to simple user operations or even without user operations. Exemplarily, with the continuous deepening of understanding of life phenomena and the continuous deepening of research on the relationship between disease and health, nucleic acid, as a carrier of key information about life, is becoming more and more important to be understood in depth. More and more researches focus on the identification of the existence of nucleic acid and the determination of nucleic acid content. The basis of these researches is to extract the nucleic acids contained in cells and viruses, and require the highest possible purity, highest possible recovery, and highest possible speed. The device 100 for driving the microfluidic chip 145 provided in the present disclosure may be used as a nucleic acid extraction instrument that meets these requirements. Exemplarily, FIGS. 8*a*-8*f* respectively show six-view schematic diagrams of a nucleic acid extractor 800 according to some embodiments of the present disclosure. The nucleic acid extractor 800 may integrate all the modules of nucleic acid extraction into one device, so that the rapid extraction of sample nucleic acid may be realized with one click.

Figure 9:
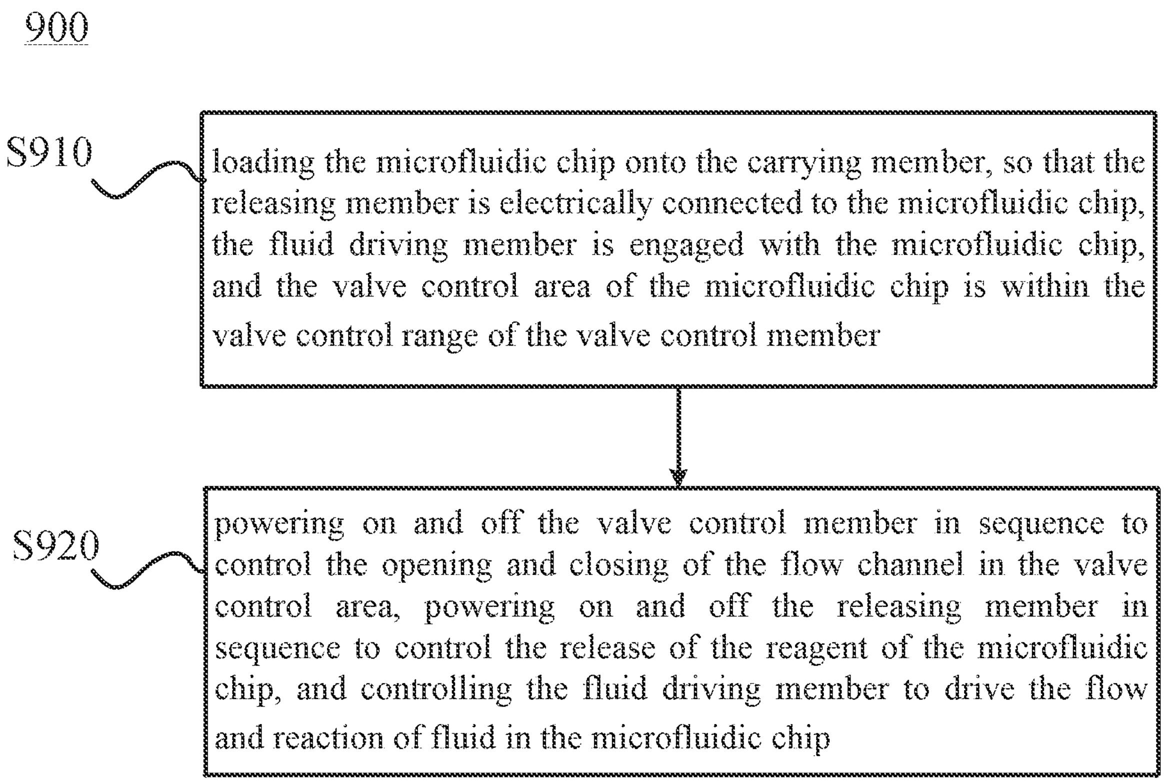
FIG. 9 schematically shows a flowchart of a driving method according to some embodiments of the present disclosure.

The embodiment of the present disclosure also provides a driving method for the aforementioned device 100 for driving the microfluidic chip 145. FIG. 9 schematically shows a flowchart of a driving method 900 according to some embodiments of the present disclosure. Referring to FIG. 9, the driving method 900 comprises: 5910, loading the microfluidic chip onto the carrying member, so that the releasing member is electrically connected to the microfluidic chip, the fluid driving member is engaged with the microfluidic chip, and the valve control area of the microfluidic chip is within the valve control range of the valve control member; and S920, powering on and off the valve control member in sequence to control the opening and closing of the flow channel in the valve control area, powering on and off the releasing member in sequence to control the release of the reagent of the microfluidic chip, and controlling the fluid driving member to drive the flow and reaction of fluid in the microfluidic chip.

In some embodiments, step S910 may comprise: moving the carrying tray to the second position; loading the microfluidic chip on the carrying tray; moving the carrying tray from the second position to the first position through the opening, and at the same time electrically connecting the releasing member and the microfluidic chip and engaging the fluid driving member with the microfluidic chip; and moving the valve control tray so that the valve control area is within the valve control range of the valve control member.

The driving method has advantages and effects similar to those of the device 100 for driving the microfluidic chip 145 above, and will not be repeated here.

Referring to FIGS. 1*a*-1*c*, 5*a*-5*e* and FIG. 9, the following uses a specific example to illustrate the process of the driving method for the device 100, in which the microfluidic chip is used for nucleic acid extraction:

Step 1: Prepare the microfluidic chip 145, inject the sample to be subjected to nucleic acid extraction into the microfluidic chip 145, and seal the microfluidic chip 145;

Step 2: Move the carrying tray 1410 to a second position 210;

Step 3: Load the microfluidic chip 145 on the carrying tray 1410;

Step 4: Move the carrying tray 1410 from the second position 210 to a first position 220 through the opening 112, and at the same time the control electrode 570 of the microfluidic chip 145 is in electrical contact with the releasing member 170 and the releasing member 170 is compressed by force; and at the same time the first movement module 450 of fluid driving member 180 is in the third position, and the elastic part 5110 of the fluid driving member 180 undergo the process of uncompressed-compression-rebound in the third direction 5130 in response to the movement of the first plug-in block 510 of the microfluidic chip 145 in the second direction 5120, so as to realize the engagement of the first slot 530 and the first plug-in block 510;

Step 5: Control the valve control member motor 712 to raise the valve control tray 1510 upward, so that the valve control valve 1520 and the temperature control member 160 are respectively close to the valve control area and the temperature control area of the microfluidic chip 145;

Step 6: Apply a voltage to the releasing member 170 to open the valve of the reservoir 560 corresponding to the microfluidic chip 145 to control the release of the reagent of the microfluidic chip 145;

Step 7: The valve control valve 1520 controls the valve corresponding to the reservoir 560 and the valve corresponding to the flow channel connected to the reservoir 560 in the microfluidic chip 145 to open, other valves remain closed, and at the same time the fluid driving member 180 starts to move towards the fourth position to drive the reagent released from the reservoir 560 into the reaction zone of the microfluidic chip 145, wherein the temperature control member 160 is selectively turned on as needed during this process to provide an appropriate temperature for the reaction;

Step 8: The fluid driving member 180 reciprocates to perform a mixing operation on the reagent released into the microfluidic chip 145; and Step 9: The fluid driving member 180 continues to move to the fourth position to drive the reagents that have completed the reaction into the waste liquid chamber or the collection tank.

One or more steps of step 6, step 7, step 8 and step 9 may be repeated many times to complete the release and reaction of lysis solution, magnetic beads, binding solution, washing solution, eluent, etc. in nucleic acid extraction.

Figure 10:
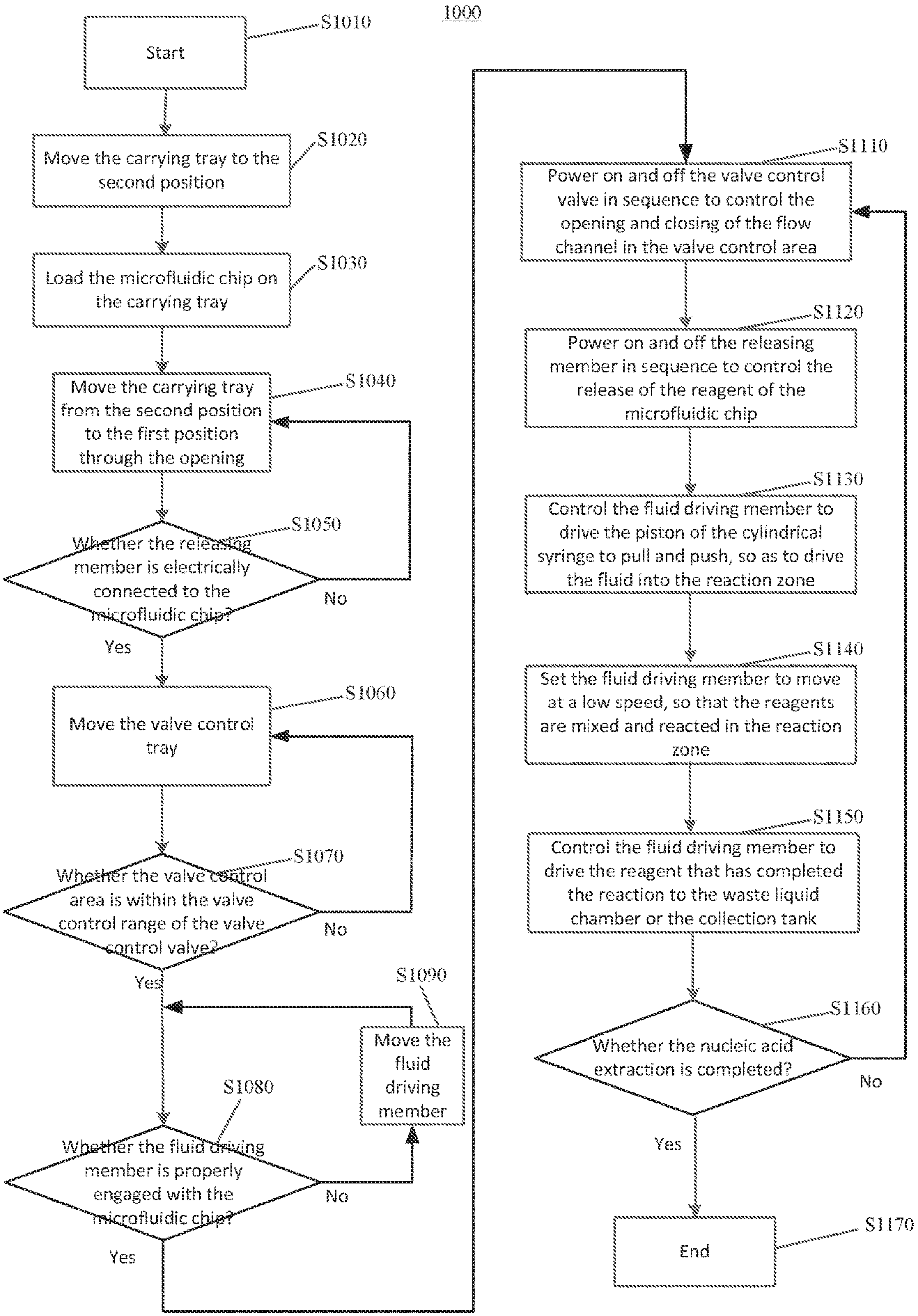
FIG. 10 schematically shows a flowchart of a driving method according to another embodiment of the present disclosure.

FIG. 10 schematically shows a flowchart of a driving method (nucleic acid extraction process) according to another embodiment of the present disclosure. In the embodiment shown in FIG. 10, the driving method (nucleic acid extraction process) 1000 comprises the following steps:

S1010, start;

S1020, Move the carrying tray to the second position;

S1030, Load the microfluidic chip on the carrying tray;

S1040, Move the carrying tray from the second position to the first position through the opening;

S1050, Determine whether the releasing member is electrically connected to the microfluidic chip: if "Yes", go to step S1060; if "No", go back to step S1040;

S1060, Move the valve control tray;

S1070, Determine whether the valve control area is within the valve control range of the valve control valve: if "Yes", go to step S1080; if "No", go back to step S1060;

S1080, Determine whether the fluid driving member is properly engaged with the microfluidic chip: if "Yes", proceed to step S1110; if "No", proceed to step S1090 (moving the fluid driving member), and perform step S1080 again after performing step S1090;

S1110, Power on and off the valve control valve in sequence to control the opening and closing of the flow channel in the valve control area;

S1120, Power on and off the releasing member in sequence to control the release of the reagent of the microfluidic chip;

S1130, Control the fluid driving member to drive the piston of the cylindrical syringe to pull and push, so as to drive the fluid into the reaction zone;

S1140, Set the fluid driving member to move at a low speed, so that the reagents are mixed and reacted in the reaction zone;

S1150, Control the fluid driving member to drive the reagent that has completed the reaction to the waste liquid chamber or the collection tank;

S1160, Determine whether the nucleic acid extraction is completed: if "Yes", go to step S1170; if "No", go back to step S1110; and S1170, End.

In particular, in the embodiment shown in FIG. 10, the driving method (nucleic acid extraction process) 1000 may comprise determining steps S1050, S1070, S1080, S1160 and corresponding feedback adjustment. In addition, in step S1080, if it is determined that the fluid driving member is not properly engaged with the microfluidic chip, it may be corrected by moving the fluid driving member, which ensures the success rate of the driving method and improves the efficiency.

As will be apparent to those skilled in the art, many different ways of performing the methods of these embodiments of the present disclosure are possible. For example, the order of the steps can be changed, or some steps can be executed in parallel. In addition, other method steps can be inserted between the steps. The inserted step may represent an improvement of the method such as described herein, or may be unrelated to the method. In addition, a given step may not be fully completed before the next step starts. It should be understood that, without contradicting each other, the features of different embodiments in the present disclosure can be used in combination with each other.

Those skilled in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

The invention claimed is:

1. A device for driving a microfluidic chip, comprising:

a carrying member comprising a carrying tray;

a releasing member configured to be electrically connected to the microfluidic chip;

a valve control member configured to control opening and closing of a flow channel of the microfluidic chip;

a fluid driving member;

a controller electrically connected to the carrying member, the releasing member, the valve control member, and the fluid driving member; and a housing comprising a bottom wall and a side wall, wherein the releasing member is disposed between the carrying member and the controller, the releasing member is in contact with the carrying tray and spaced from the controller, the valve control member is disposed between the bottom wall of the housing and the carrying tray, the valve control member is in contact with the bottom wall of the housing and spaced from the carrying tray, the carrying member, the releasing member, the valve control member, the fluid driving member, and the controller are fixed on the bottom wall of the housing, and wherein the valve control member comprises:

a valve control tray, the valve control tray is reciprocally movable between two different positions along a thickness direction of the bottom wall of the housing, the two different positions respectively correspond to end positions of two ends of a reciprocating movement of the valve control tray;

a valve control valve on the valve control tray; and a valve-controlled tray driving member connected to the valve control tray and configured to drive the valve control tray to reciprocally move.

2. The device according to The device according to claim 1, wherein the carrying tray comprises a bottom wall of the carrying tray and side walls of the carrying tray, the bottom wall of the carrying tray comprises two edges, the side walls of the carrying tray are on the two edges of the bottom wall of the carrying tray and connected to the bottom wall of the carrying tray; and wherein the carrying member further comprises a carrying tray driving member comprising a carrying tray transmission module, the carrying tray driving member is connected to the carrying tray through the carrying tray transmission module, the carrying tray driving member is configured to drive the carrying tray to move between the first position and the second position different from the first position.

3. The device according to claim 2, wherein an opening is provided on the side wall of the housing.

4. The device according to claim 3, wherein the carrying tray driving member further comprises a carrying tray power module and a carrying tray slide rail, wherein the carrying tray transmission module is connected to the carrying tray, the carrying tray slide rail is fixed on the bottom wall of the housing and the carrying tray power module drives the carrying tray transmission module to drive the carrying tray to move on the carrying tray slide rail, wherein the carrying tray power module comprises a carrying tray motor, the carrying tray transmission module comprises a carrying tray slider that moves on the carrying tray slide rail and a carrying tray connector, the carrying tray slider is fixedly connected to the carrying tray through the carrying tray connector, and wherein the carrying tray motor is fixed on the bottom wall of the housing, the carrying tray transmission module further comprises a carrying tray sliding table and a carrying tray screw, the carrying tray sliding table is coaxially connected to a rotor of the carrying tray motor by the carrying tray screw, the carrying tray sliding table is fixedly connected to the carrying tray slider.

5. The device according to claim 4, wherein: the carrying tray motor is a stepping motor.

6. The device according to claim 5, wherein the carrying tray driving member further comprises a first carrying tray stop and a second carrying tray stop located on opposite sides of the carrying tray sliding table, the carrying tray screw passes through the first carrying tray stop and the second carrying tray stop, and the first carrying tray stop and the second carrying tray stop are fixed on the bottom wall of the housing.

7. The device according to claim 3, wherein the fluid driving member comprises a fluid driving member driving part and a first movement module, the first movement module is reciprocally movable between a third position and a fourth position in a first direction, and the third position and the fourth position respectively correspond to end positions of two ends of a reciprocating movement of the first movement module, wherein the fluid driving member driving part comprises a fluid driving member power module, a fluid driving member transmission module, and a fluid driving member slide rail, the fluid driving member transmission module comprises a fluid driving member screw, the fluid driving member power module is coaxially connected to the fluid driving member transmission module by the fluid driving member screw, and wherein the fluid driving member transmission module is connected to the first movement module, the fluid driving member slide rail is fixed to the bottom wall of the housing, and the fluid driving member power module drives the fluid driving member transmission module to drive the first movement module to move on the fluid driving member slide rail.

8. The device according to claim 7, wherein the fluid driving member power module comprises a fluid driving member motor, wherein the fluid driving member transmission module comprises a fluid driving member slider that moves on the fluid driving member slide rail and a fluid driving member connector, the fluid driving member slider is fixedly connected to the first movement module through the fluid driving member connector, wherein the fluid driving member motor drives the fluid driving member slider to move on the fluid driving member slide rail, and wherein the fluid driving member motor is a stepping motor, and the stepping motor is fixed on the side wall of the housing, the fluid driving member transmission module further comprises a fluid driving member sliding table, the fluid driving member sliding table is coaxially connected to a rotor of the fluid driving member motor by the fluid driving member screw, the fluid driving member sliding table is fixedly connected to the fluid driving member slider, and a length direction of the fluid driving member screw is parallel to a length direction of the fluid driving member sliding rail.

9. The device according to claim 8, wherein the fluid driving member driving part further comprises a first fluid driving member stop and a second fluid driving member stop located on opposite sides of the fluid driving member sliding table, the fluid driving member screw passes through the first fluid driving member stop and the second fluid driving member stop, and the first fluid driving member stop and the second fluid driving member stop are fixed on the side wall of the housing.

10. The device according to claim 9, wherein the fluid driving member further comprises a shaft and a second movement module, the first movement module is coaxially connected to the second movement module by the shaft, the second movement module comprises a first protrusion comprising an inclined surface, and wherein the first protrusion further comprises retaining walls, the retaining walls are on two sides of the inclined surface along an extension direction of the inclined surface.

11. The device according to claim 9, wherein a number of the fluid driving member is two, the two fluid driving members comprise a first fluid driving member and a second fluid driving member spaced from the first fluid driving member, and wherein the first fluid driving member comprises one fluid driving member slide rail and the second fluid driving member comprises one fluid driving member slide rail, the carrying tray is projected on the bottom wall of the housing to form a first projection, the fluid driving member slide rail of the first fluid driving member is projected on the bottom wall of the housing to form a second projection, the fluid driving member slide rail of the second fluid driving member is projected on the bottom wall of the housing to form a third projection, the first projection is located between the second projection and the third projection.

12. The device according to claim 3, wherein the releasing member comprises:

a releasing member supporting seat fixed on the bottom wall of the housing; and an electrode contact installed on the releasing member supporting seat.

13. The device according to claim 12, wherein the electrode contact comprises a pogo pin connector.

14. The device according to claim 1, wherein the valve-controlled tray driving member comprises a valve control tray power module and a valve control tray transmission module, the valve control tray transmission module is connected to the valve control tray, the valve control tray transmission module comprises a valve control tray screw, the valve control tray power module is coaxially connected to the valve control tray transmission module by the valve control tray screw, and the valve control tray power module drives the valve control tray transmission module to drive the valve control tray to move between the two different positions in the thickness direction of the bottom wall of the housing, wherein the valve control tray power module comprises a valve control member motor, the valve control member motor is a stepping motor, and the stepping motor is fixedly connected to the side wall of the housing, and wherein the valve control tray transmission module further comprises a valve control tray sliding table, the valve control tray sliding table is coaxially connected to a rotor of the valve control member motor by the valve control tray screw, the valve control tray sliding table is fixedly connected to the valve control tray, and a length direction of the valve control tray screw is parallel to the thickness direction of the bottom wall of the housing.

15. The device according to claim 14, wherein the valve control tray driving member further comprises a first valve control tray stop and a second valve control tray stop located on opposite sides of the valve control tray sliding table, the valve control tray screw passes through the first valve control tray stop and the second valve control tray stop, the first valve control tray stop is fixed on the side wall of the housing, and the second valve control tray stop is fixed on the bottom wall of the housing.

16. The device according to claim 4, wherein the carrying tray slide rail comprises two slide rails, the valve control member is projected on the bottom wall of the housing to form a fourth projection, the two slide rails are projected on the bottom wall of the housing to respectively form a fifth projection and a sixth projection, the fourth projection is located between the fifth projection and the sixth projection.

17. The device according to claim 1, further comprising a temperature control member mounted on the valve control tray, wherein the temperature control member comprises a PTC heater or a cermet heating element.

18. The device according to claim 14, wherein the releasing member comprises a releasing member supporting seat, and the releasing member supporting seat is provided with a through hole, and the valve control tray is connected to the valve control tray sliding table through the through hole.

19. The device according to claim 3, further comprising a display mounted on an outer surface of the housing, wherein the display is disposed between the bottom wall of the housing and the opening of the housing.

20. A device for driving a microfluidic chip, comprising:

a carrying member comprising a carrying tray;

a releasing member configured to be electrically connected to the microfluidic chip;

a valve control member configured to control opening and closing of a flow channel of the microfluidic chip;

a fluid driving member;

a controller electrically connected to the carrying member, the releasing member, the valve control member, and the fluid driving member; and a housing comprising a bottom wall and a side wall, wherein the releasing member is disposed between the carrying member and the controller, the releasing member is in contact with the carrying tray and spaced from the controller, the valve control member is disposed between the bottom wall of the housing and the carrying tray, the valve control member is in contact with the bottom wall of the housing and spaced from the carrying tray, the carrying member, the releasing member, the valve control member, the fluid driving member, and the controller are fixed on the bottom wall of the housing, wherein the carrying member further comprises a carrying tray driving member, the carrying tray driving member comprises a carrying tray power module, a carrying tray transmission module, and a carrying tray slide rail, the carrying tray transmission module is connected to the carrying tray, the carrying tray slide rail is fixed on the bottom wall of the housing and the carrying tray power module drives the carrying tray transmission module to drive the carrying tray to move on the carrying tray slide rail, and wherein the carrying tray power module comprises a carrying tray motor, the carrying tray transmission module comprises a carrying tray slider that moves on the carrying tray slide rail and a carrying tray connector, the carrying tray slider is fixedly connected to the carrying tray through the carrying tray connector, the carrying tray motor is fixed on the bottom wall of the housing, the carrying tray transmission module further comprises a carrying tray sliding table and a carrying tray screw, the carrying tray sliding table is coaxially connected to a rotor of the carrying tray motor by the carrying tray screw, the carrying tray sliding table is fixedly connected to the carrying tray slider.

* * * * *